United States Patent
Ahn et al.

(10) Patent No.: US 11,242,634 B2
(45) Date of Patent: Feb. 8, 2022

(54) CLOTHES TREATMENT APPARATUS AND METHOD FOR CONTROLLING THE SAME

(71) Applicant: Samsung Electronics Co., Ltd., Suwon-si (KR)

(72) Inventors: Hyun Jin Ahn, Suwon-si (KR); Joon Ho Lee, Suwon-si (KR); Dong Bin Cho, Suwon-si (KR); Seung Woo Hong, Suwon-si (KR); Bo Bin Kim, Suwon-si (KR); Hae Yoon Park, Suwon-si (KR); Dong Min Lee, Suwon-si (KR); Kyoung Ae Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 269 days.

(21) Appl. No.: 16/279,834

(22) Filed: Feb. 19, 2019

(65) Prior Publication Data

US 2019/0257021 A1  Aug. 22, 2019

(30) Foreign Application Priority Data

Feb. 19, 2018  (KR) .................. 10-2018-0019159

(51) Int. Cl.
*D06F 33/44* (2020.01)
*D06F 58/46* (2020.01)
(Continued)

(52) U.S. Cl.
CPC .............. *D06F 33/44* (2020.02); *D06F 33/70* (2020.02); *D06F 34/06* (2020.02); *D06F 58/46* (2020.02);
(Continued)

(58) Field of Classification Search
CPC .......... D06F 33/00; D06F 33/44; D06F 33/70; D06F 34/06; D06F 34/18; D06F 34/28;
(Continued)

(56) References Cited

U.S. PATENT DOCUMENTS

| | | |
|---|---|---|
| 2005/0016228 A1 | 1/2005 | Bergemann et al. |
| 2005/0257397 A1 | 11/2005 | Woerdehoff et al. |

(Continued)

FOREIGN PATENT DOCUMENTS

| | | |
|---|---|---|
| CN | 107523964 A | 12/2017 |
| EP | 1029964 A2 | 8/2000 |

(Continued)

OTHER PUBLICATIONS

Supplementary European Search Report dated Dec. 16, 2020 in connection with European Application No. 19753631.1, 10 pages.

(Continued)

*Primary Examiner* — Joseph L. Perrin

(57) ABSTRACT

Disclosed herein is a clothes treatment apparatus. The clothes treatment apparatus includes a drum configured to accommodate clothes, an inputter configured to receive one of a plurality of programs and configured to receive a start command, a storage configured to store information on a setting time corresponding to a weight of clothes for each program and configured to store information on a default time for each program previously executed, in the form of tables, a processor configured to detect a weight of clothes when any one program is received and a start command is received, configured to identify a setting time corresponding to the detected weight of clothes and the received program, configured to control the execution of the received program based on the identified setting time, and configured to store an operation time, which is taken until the completion of the received program, as a default time, and a display configured (Continued)

to display a remaining time during the execution of the received program.

8 Claims, 22 Drawing Sheets

(51) Int. Cl.
| | | |
|---|---|---|
| *D06F 33/70* | (2020.01) | |
| *D06F 34/28* | (2020.01) | |
| *H01H 43/04* | (2006.01) | |
| *D06F 34/06* | (2020.01) | |
| *H01H 43/12* | (2006.01) | |
| *D06F 34/18* | (2020.01) | |
| *D06F 103/04* | (2020.01) | |
| *D06F 103/08* | (2020.01) | |
| *D06F 103/24* | (2020.01) | |
| *D06F 103/38* | (2020.01) | |
| *D06F 103/44* | (2020.01) | |
| *D06F 105/02* | (2020.01) | |
| *D06F 105/56* | (2020.01) | |
| *D06F 105/58* | (2020.01) | |
| *D06F 105/60* | (2020.01) | |
| *D06F 34/32* | (2020.01) | |
| *D06F 101/20* | (2020.01) | |

(52) U.S. Cl.
CPC ............. *H01H 43/04* (2013.01); *D06F 34/18* (2020.02); *D06F 34/28* (2020.02); *D06F 34/32* (2020.02); *D06F 2101/20* (2020.02); *D06F 2103/04* (2020.02); *D06F 2103/08* (2020.02); *D06F 2103/24* (2020.02); *D06F 2103/38* (2020.02); *D06F 2103/44* (2020.02); *D06F 2105/02* (2020.02); *D06F 2105/56* (2020.02); *D06F 2105/58* (2020.02); *D06F 2105/60* (2020.02); *H01H 43/122* (2013.01)

(58) Field of Classification Search
CPC ...... D06F 34/32; D06F 58/46; D06F 2101/20; D06F 2103/04; D06F 2105/56; D06F 2105/58; D06F 2105/60
See application file for complete search history.

(56) References Cited

U.S. PATENT DOCUMENTS

| | | |
|---|---|---|
| 2008/0244836 A1 | 10/2008 | Kim et al. |
| 2013/0291313 A1 | 11/2013 | Seo et al. |
| 2015/0169194 A1* | 6/2015 | Ban .................. D06F 34/28 |
| | | 715/771 |

FOREIGN PATENT DOCUMENTS

| | | |
|---|---|---|
| JP | 2005-34414 A | 2/2005 |
| JP | 2014-28014 A | 2/2014 |
| KR | 10-2008-0090929 A | 10/2008 |
| KR | 10-2011-0014349 A | 2/2011 |
| KR | 10-2013-0143474 A | 12/2013 |
| KR | 10-2015-0118749 A | 10/2015 |
| KR | 10-2017-0049611 A | 5/2017 |
| WO | 03029549 A1 | 4/2003 |
| WO | 2011080074 A1 | 7/2011 |

OTHER PUBLICATIONS

ISA/KR, International Search Report and Written Opinion of the International Searching Authority, International Application No. PCT/KR2019/001965, dated Jun. 12, 2019, 11 pages.

* cited by examiner

FIG.6

| NORMAL WASH | | | | | |
|---|---|---|---|---|---|
| WEIGHT LEVEL | 1 | 2 | 3 | 4 | 5 |
| SETTING TIME | a | b | c | d | e |

FIG. 7

| COURSE | DAY NUMBER | MONDAY (WEIGHT) | TUESDAY | WEDNESDAY | THURSDAY | FRIDAY | SATURDAY | SUNDAY |
|---|---|---|---|---|---|---|---|---|
| NORMAL WASH | 1 | 1(0.5) | 2 | 3 | 2 | 4 | 5 | 4 |
| | 2 | 1(0.6) | 2 | 2 | 2 | 2 | 4 | 4 |
| | 3 | 2(1.3) | 1 | 3 | 3 | 4 | 5 | 5 |
| | 4 | 1(0.7) | 1 | 3 | 2 | 2 | 4 | 5 |
| | 5 | 1(0.4) | 1 | 2 | 2 | 3 | 4 | 4 |

FIG. 8A

| SUMMER NORMAL WASH | DAY | MONDAY | TUESDAY | WEDNESDAY | THURSDAY | FRIDAY | SATURDAY | SUNDAY |
|---|---|---|---|---|---|---|---|---|
| | WEIGHT LEVEL | 1 | 1 | 2 | 2 | 3 | 4 | 5 |
| | DEFAULT TIME | a | a | b | b | c | d | e |

FIG. 8B

| WINTER NORMAL WASH | DAY | MONDAY | TUESDAY | WEDNESDAY | THURSDAY | FRIDAY | SATURDAY | SUNDAY |
|---|---|---|---|---|---|---|---|---|
| | WEIGHT LEVEL | 2 | 2 | 3 | 3 | 4 | 5 | 5 |
| | DEFAULT TIME | b | b | c | c | d | e | e |

FIG.9

| DAY (DATE) | MONDAY (06) | TUESDAY (07) | WEDNESDAY (08) [RAIN] | THURSDAY (09) | FRIDAY (10) | SATURDAY (11) | SUNDAY (12) | MONDAY (13) | TUESDAY (14) | WEDNESDAY (15) | THURSDAY (16) [Today] | FRIDAY (17) | SATURDAY (18) | SUNDAY (19) |
|---|---|---|---|---|---|---|---|---|---|---|---|---|---|---|
| WEIGHT LEVEL | 3 | × | 1 | × | × | × | × | × | × | × | 5 | × | × | 4 |
| DEFAULT TIME | c | × | a | × | × | × | × | × | × | × | e | × | × | d |

FIG.14

| PROGRAM | WEIGHT OF CLOTHES | CYCLE | SMALL | | | MEDIUM | | | LARGE | | |
|---|---|---|---|---|---|---|---|---|---|---|---|
| | | | WASH | RINSE | DEWATERING | WASH | RINSE | DEWATERING | WASH | RINSE | DEWATERING |
| NORMAL WASH | | CYCLE TIME (MINUTE) | 20 | 30 | 10 | 22 | 36 | 14 | 24 | 42 | 15 |
| | | SETTING TIME | 01:00 | | | 01:12 | | | 01:21 | | |
| WOOL WASH | | CYCLE TIME (MINUTE) | 18 | 14 | 14 | 22 | 16 | 14 | 25 | 18 | 15 |
| | | SETTING TIME | 00:46 | | | 00:52 | | | 00:58 | | |
| COMFORTER WASH | | CYCLE TIME (MINUTE) | 22 | 32 | 13 | 26 | 38 | 14 | 28 | 42 | 15 |
| | | SETTING TIME | 01:07 | | | 01:18 | | | 01:25 | | |

FIG.15

| DATE | 1/2 | 1/5 | 1/7 | 1/9 | 1/12 | 1/16 | 1/18 |
|---|---|---|---|---|---|---|---|
| WASHING PROGRAM | NORMAL WASH | NORMAL WASH | NORMAL WASH | WOOL WASH | NORMAL WASH | WOOL WASH | NORMAL WASH |
| WEIGHT LEVEL | MEDIUM | MEDIUM | SMALL | SMALL | LARGE | SMALL | SMALL |
| OPERATION TIME | 01:12 | 01:12 | 00:46 | 01:00 | 01:21 | 00:46 | 01:00 |

FIG.16A

| NORMAL WASH | ... | 01:12 | 01:12 | 01:00 | 01:21 | 01:00 |

FIG.16B

| WOOL WASH | ... | 00:46 | 00:46 |

CLOTHES TREATMENT APPARATUS AND METHOD FOR CONTROLLING THE SAME

CROSS-REFERENCE TO RELATED APPLICATION

This application is based on and claims priority under 35 U.S.C. § 119 to Korean Patent Application No. 10-2018-0019159, filed on Feb. 19, 2018, in the Korean Intellectual Property Office, the disclosure of which is incorporated by reference herein in its entirety.

BACKGROUND

1. Field

The disclosure relates to a clothes treatment apparatus capable of providing at least one piece of laundry information and drying information and a method for controlling the same.

2. Description of the Related Art

Generally, a clothes treatment apparatus is an apparatus that washes or dries laundry by rotating a cylindrical rotating tub in which laundry is placed.

The types of the clothes treatment apparatus include a clothes treatment apparatus which washes laundry by lifting the laundry along an inner circumferential surface of a drum and dropping the laundry when the drum is horizontally disposed and rotates about a horizontal axis, and a clothes treatment apparatus which washes laundry using a water stream generated by a pulsator when a drum having the pulsator is vertically disposed in the clothes treatment apparatus and rotates about a vertical axis.

The clothes treatment apparatus in which the drum is horizontally disposed is referred to as a front loading clothes treatment apparatus since a laundry inlet is formed in a front side of the clothes treatment apparatus, and the clothes treatment apparatus in which the drum is vertically disposed is referred to as a top loading clothes treatment apparatus since a laundry inlet is formed in an upper portion of the clothes treatment apparatus.

Generally, a clothes treatment apparatus washes laundry by employing any one method of the above mentioned two methods.

After measuring a weight of the laundry, the clothes treatment apparatus obtains an operation time which is required for washing, based on the measured weight of laundry and a washing program that is input by a user, and outputs the obtained actual operation time. Therefore, the clothes treatment apparatus may allow a user to recognize the operation time of the clothes treatment apparatus.

The user has to wait a long time to receive the operation time from the clothes treatment apparatus, which is inconvenient.

SUMMARY

Therefore, it is an aspect of the present disclosure to provide a clothes treatment apparatus capable of displaying a default time corresponding to weight estimation information of clothes, detecting a weight of clothes, and displaying an actual operation time corresponding to the weight of the clothes, and a method for controlling the same.

It is another aspect of the present disclosure to provide a clothes treatment apparatus capable of displaying a default time corresponding to a program selected by a user, detecting a weight of clothes, and displaying an actual operation time corresponding to the detected weight of the clothes and the selected program, and a method for controlling the same.

Additional aspects of the present disclosure will be set forth in part in the description which follows and, in part, will be obvious from the description, or may be learned by practice of the present disclosure.

In accordance with an aspect of the disclosure, a clothes treatment apparatus includes a drum configured to accommodate clothes, an inputter configured to receive one of a plurality of programs and configured to receive a start command, a storage configured to store information on a setting time corresponding to a weight of clothes for each program and configured to store information on a default time for each program executed in the past, in the form of tables, a processor configured to detect a weight of clothes when any one program is received and a start command is received, configured to identify a setting time corresponding to the detected weight of clothes and the received program, configured to control the execution of the received program based on the identified setting time, and configured to store an operation time, which is taken until the completion of the received program, as a default time, and a display configured to display a remaining time during the execution of the received program.

Before detecting the weight of clothes, the processor may obtain a default time corresponding to the received program, in the information of the table of the storage, and allow the obtained default time to be displayed as a remaining time.

The processor may obtain a plurality of default times corresponding to the received program, in the information of the table stored in the storage, and allow an average time of the obtained plurality of default times to be displayed as a remaining time.

The processor may obtain a plurality of default times corresponding to the received program, in the information of the table stored in the storage, and allow a default time, which is the most recently stored among the obtained plurality of default times, to be displayed as a remaining time.

The processor may obtain a plurality of default times corresponding to the received program, in the information of the table stored in the storage, and allow a default time, which is the minimum time among the obtained plurality of default times, to be displayed as a remaining time.

The processor may obtain a plurality of default times corresponding to the received program, in the information of the table stored in the storage, and allow a default time, which is the maximum time among the obtained plurality of default times, to be displayed as a remaining time.

When the weight of clothes is detected, the processor may change the remaining time on the display into the setting time and display the setting time.

The clothes treatment apparatus may further include a sound outputter configured to output a sound when the remaining time on the display is changed into the setting time.

In accordance with another aspect of the disclosure, a method for controlling a clothes treatment apparatus includes according to any one program being received among a plurality of programs, obtaining a default time corresponding to the received program based on table information stored in a storage; displaying the obtained default time as a remaining time on a display; based on a start command being received, detecting a weight of clothes accommodated in a drum; identifying a setting time corresponding to the detected weight of clothes and the received program; changing the remaining time displayed on the display into the identified setting time and displaying the setting time; executing the received program; based on the completion of the received program, identifying an operation time, which is taken until the completion of the received program; and storing the identified operation time as a default time in a table of the storage.

The displaying of the obtained default time as a remaining time on the display may include obtaining a plurality of default times corresponding to the received program, in the information of the table stored in the storage and displaying an average time of the obtained plurality of default times as the remaining time.

The displaying of the obtained default time as a remaining time on the display may include displaying a default time, which is the most recently stored among the default times corresponding to the received program, in the information of the table stored in the storage, as a remaining time.

The displaying of the obtained default time as a remaining time on the display may include obtaining default times corresponding to the received program, in the information of the table stored in the storage, and displaying the minimum time among the obtained default times as a remaining time.

The displaying of the obtained default time as a remaining time on the display may include obtaining default times corresponding to the received program, in the information of the table stored in the storage, and displaying the maximum time among the obtained default times as a remaining time.

The method may further include outputting a sound when the remaining time displayed on the display is changed into the identified setting time.

The table of the storage may include information on a setting time corresponding to a weight of clothes for each program and information on a default time for each program executed in the past.

BRIEF DESCRIPTION OF THE DRAWINGS

These and/or other aspects of the disclosure will become apparent and more readily appreciated from the following description of embodiments, taken in conjunction with the accompanying drawings of which:

FIG. 6 is a table illustrating a weight level of laundry of day of the week of normal wash, which is stored in a storage of the clothes treatment apparatus according to an embodiment of the disclosure;

FIG. 7 is a table illustrating a setting time for each weight level of the normal wash, which is stored in the storage of the clothes treatment apparatus according to an embodiment of the disclosure;

FIG. 8A is a table illustrating a weight of laundry and a washing time of a normal wash program for each season and day of the week, which is stored in the storage of the clothes treatment apparatus according to an embodiment of the disclosure;

FIG. 8B is a table illustrating a weight of laundry and a washing time of a normal wash program for each season and day of the week, which is stored in the storage of the clothes treatment apparatus according to an embodiment of the disclosure;

FIG. 9 is a table illustrating a weight of laundry and a washing time for each date, which is stored in the storage of the clothes treatment apparatus according to an embodiment of the disclosure;

FIG. 14 is a table illustrating a setting time for each washing program, which is stored in a storage of the clothes treatment apparatus according to another embodiment of the disclosure;

FIG. 15 is a table illustrating history information for each date, which is stored in the storage of the clothes treatment apparatus according to another embodiment of the disclosure;

FIG. 16A is a table illustrating a default time for each washing program, which is stored in the storage of the clothes treatment apparatus according to another embodiment of the disclosure;

FIG. 16B is a table illustrating a default time for each washing program, which is stored in the storage of the clothes treatment apparatus according to another embodiment of the disclosure;

DETAILED DESCRIPTION

Figure 1:
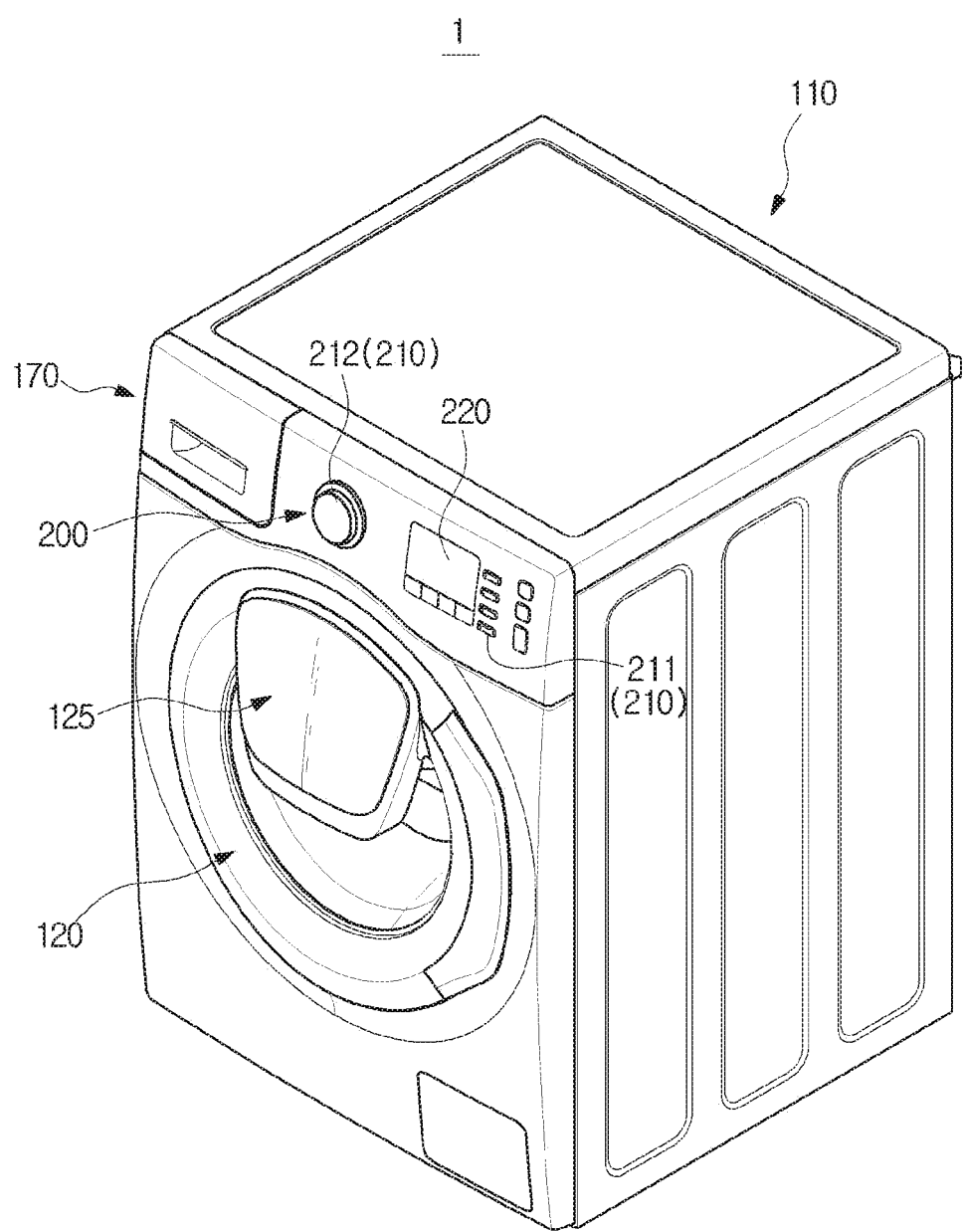
FIG. 1 is a view of an appearance of a clothes treatment apparatus according to an embodiment of the disclosure.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

"At least one of a, b, or c" may include only a, only b, only c, both a and b, both a and c, both b and c, all of a, b and c, or variation thereof.

Reference will now be made in detail to embodiments of the present disclosure, examples of which are illustrated in the accompanying drawings.

A washing machine will be described as an example of a clothes treatment apparatus 1 according to an embodiment.

Figure 2:
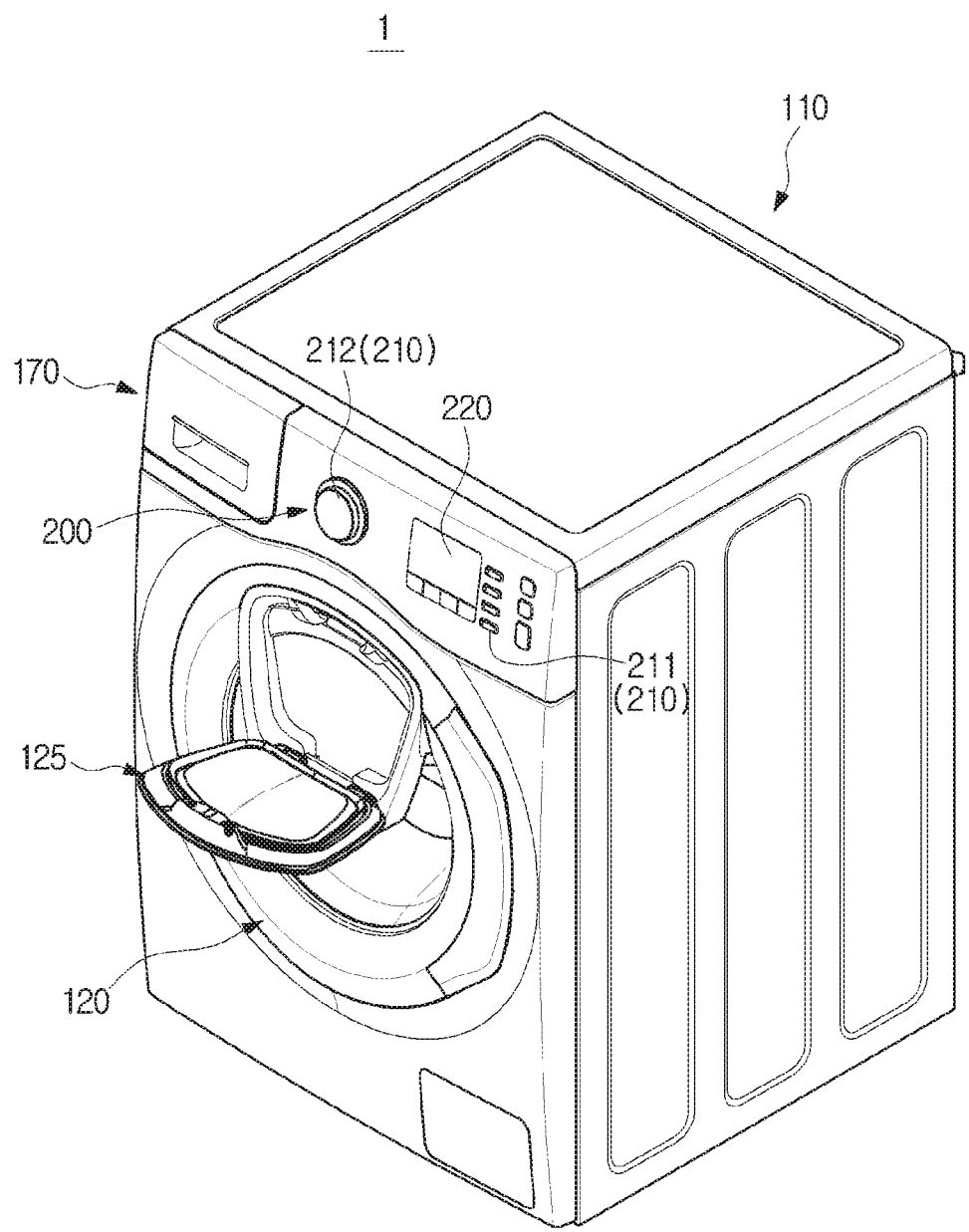
FIG. 2 is another view of the appearance of the clothes treatment apparatus according to an embodiment of the disclosure.
Figure 3:
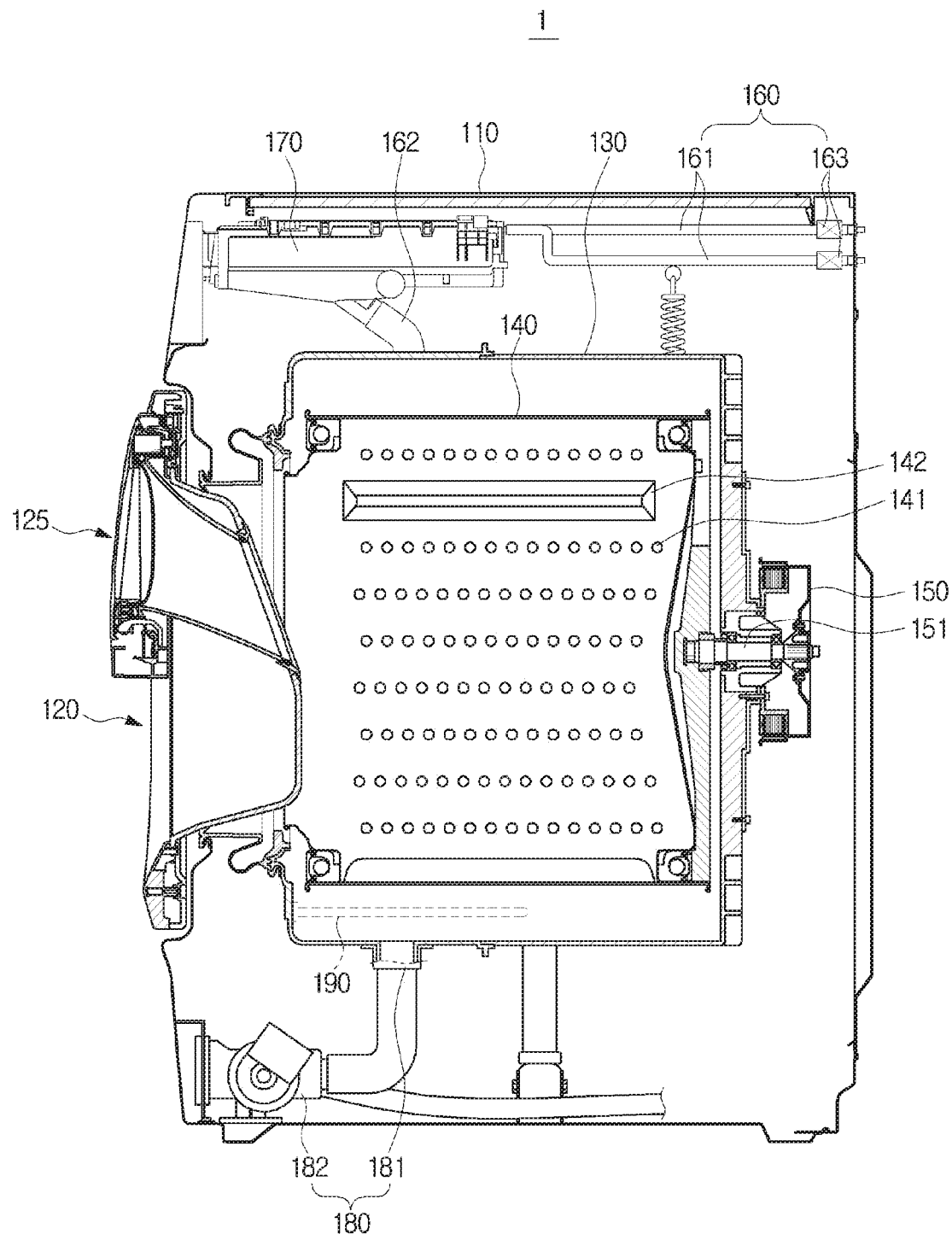
FIG. 3 is a cross-sectional view of the clothes treatment apparatus according to an embodiment of the disclosure.

FIG. 1 is a view of an appearance of a washing machine according to an embodiment of the disclosure, FIG. 2 is another view of the appearance of the washing machine according to an embodiment of the disclosure, and FIG. 3 is a cross-sectional view of the washing machine according to an embodiment of the disclosure.

The washing machine, which is the clothes treatment apparatus 1, performs a washing operation based on a weight of laundry, and a washing program and an option selected by a user.

The weight of the laundry includes a weight of the clothes. In addition, the weight of the clothes may mean a weight of all the laundry placed in a drum, such as bedding and a towel.

The washing program may include normal wash, bedding wash, boiling, wool wash, towel wash, and quick wash. The options include at least one of water temperature, a wash cycle time, the number of rinse cycles, an intensity of dewatering circle and a dewatering cycle time, and may further include at least one of an intensity of dry cycle and a dry cycle time.

The clothes treatment apparatus according an embodiment may be a front loading type washing machine in which a laundry inlet for laundry is formed in front of a main body, or a top loading type washing machine in which a laundry inlet for laundry is formed on the top of the main body.

However, according to the arbitrary choice of the designer, the clothes treatment apparatus may be implemented as a washing machine in which the front loading type washing machine is combined with the top loading type washing machine.

In addition, the clothes treatment apparatus may perform a dry cycle in addition to the wash, rinse and dewatering cycle.

A front loading type washing machine will be described as an example of a clothes treatment apparatus according to an embodiment.

A structure of the front loading type washing machine will be described with reference to FIGS. 1 to 3.

The washing machine includes a body 110, a door 120, a tub 130, a drum 140, a motor 150, a water supplier 160, a detergent compartment 170, a water discharger 180, a heating portion 190, and a control panel 200.

The body 110 forms an outer appearance of the washing machine, and on one side thereof, an inlet into which the laundry is put or out which the laundry is taken is formed.

The body 110 is provided with a door 120 opening and closing the inlet, and a gasket (not shown) sealing between the door 120 and the inlet is mounted on a circumferential surface of the inlet.

The washing machine may further include an auxiliary door 125. The auxiliary door 125 is provided in the door 120 and allows laundry to be put into the washing machine without opening the door 120 that is the door 120 is in a closed state, during the wash cycle, the rinse cycle, the dewatering cycle and the dry cycle.

The auxiliary door 125 is provided at a position higher than a water level of water stored in the tub 130 so that water (wash water or rinse water) placed in the tub 20 can be prevented from overflowing when the auxiliary door 125 is opened during the operation of the washing machine.

As illustrated in FIG. 2, the auxiliary door 125 may be provided on the door 120 that is a main door, particularly on an upper portion of the main door 120 and the auxiliary door 125 may be opened or closed independently of the main door 120.

In addition, the auxiliary door 125 may be opened and closed by rotating in the pitch direction and the main door 120 may be opened and closed by rotating in the yaw direction.

The tub 130 is fixed to the inside of the body 110 and receives water supplied from the water supplier 160.

A motor 150 rotating the drum 140 may be mounted on the outer side of the tub 130.

The drum 140 having a shape corresponding to a shape of the tub 130 is positioned inside the tub 130. A rotary shaft 151 is mounted on the outer side of the drum 140. The rotary shaft 151 may extend to the outside of the tub 130 and then be connected to the motor 150 mounted on the outer side of the tub 130. The rotary shaft 151 transfers the driving force of the motor 150 to the drum 140.

Accordingly, the drum 140 may rotate clockwise or counterclockwise in the tub 130 by the driving force of the motor 150.

An opening is formed on one surface of the drum 140, and a plurality of holes 141 are formed in the other surface. The drum 140 receives the laundry through the opening when the door 120 is opened, and allows the water to flow through the plurality of holes formed in the remaining surface.

That is, the plurality of holes 141 allow water in the tub 130 to flow into the drum 140, and water in the drum 140 to be discharged toward the tub 130.

On the inner circumferential surface of the drum 140, a plurality of lifters 142 allowing the rise and fall of the laundry during the rotation of the drum 140 may be installed.

The motor 150 is driven during measuring a weight of laundry, and during the wash cycle, the rinse cycle, the dewatering cycle and the dry cycle, and the motor 150 allows the laundry placed in the drum 140 to be washed, rinsed, dewatered and dried by rotating the drum 140 by using the rotational force according to the drive.

The motor 150 may generate a rotational force from the electric power of the external power source and transmit the rotational force to the drum 140 through the rotational shaft 151. The motor 150 may employ a brushless direct current motor (BLDC motor) or a synchronous motor, which facilitates control of the rotation speed. In addition, the motor 150 may employ a direct current motor (DC motor) or an induction motor which is inexpensive.

The water supplier 160 includes water supply pipes 161 and 162 and a water supply valve 163.

One end of the water supply pipe 161 may be connected to an external water pipe (not shown), and the other end may be connected to the detergent compartment 170. The water supply pipe 161 receives water from the external water pipe and guides the water into the detergent compartment 170.

The water supply pipe 162 may be connected between the detergent compartment 170 and the tub 130. The water supply pipe 162 guides the water, which is supplied from the external water pipe, together with the detergent of the detergent compartment 170 into the tub 130 and the drum 140.

The water supply valve 163 is opened and closed in the wash cycle and rinse cycle to regulate the amount of water supplied into the tub 130 and the drum 140.

The detergent compartment 170 stores the detergent put on by the user. That is, the detergent compartment 170 may store at least one of synthetic detergent, fabric softener, and bleach.

During the wash cycle, the detergent compartment 170 may allow water, which flows via the water supply pipes 161, together with the detergent to flow into the water supply pipes 162.

The detergent compartment 170 may be provided with a detergent regulator (not shown). The detergent regulator (not shown) regulates the amount of the detergent stored in the detergent compartment 170 to flow the detergent out of the detergent compartment 170. That is, the detergent regulator (not shown) regulates the amount of detergent in the detergent compartment 170 and puts the detergent into the drum 140.

The water discharger 180 includes a drain pipe 181 and a drain pump 182.

The drain pipe 181 may be provided under the tub 130.

The drain pump 182 pumps the water inside the tub 130 and the drum 140 during the drainage and dewatering cycle. That is, during the pumping, the drain pump 182 allows the water in the tub 130 and the drum 140 to flow along the drain pipe 181 and guides the introduced water to the outside through the drain pipe 181, thereby discharging the water in the tub 130 and the drum 140 to the outside.

The washing machine may wash the laundry using high temperature water.

The washing machine may further include the heating portion 190 provided on the tub 130 to heat the water in the tub 130. The heating portion 190 may include at least one heater.

The washing machine may further include a temperature detector (not shown) detecting the temperature of the heated water, and may control the operation of the heating portion based on the temperature of the water detected by the temperature detector.

The control panel 200 may be provided on the front side of the body 110 and may be provided on the upper portion of the body for the convenience of the user.

The control panel 200 may include an inputter 210 receiving an operation command of the washing machine and a display 220 displaying operation information of the washing machine.

The inputter 210 may include a plurality of buttons 211 receiving start, pause, and stop commands, and may further include a jog dial 212 receiving a washing program.

In addition, the inputter 210 receiving the washing program may be provided in a button type.

The inputter 210 may further include a button 211 receiving an option.

The display 220 displays a period of time required for washing.

The period of time required for washing may include a default time displayed before the weight of the laundry is detected and an operation time displayed after the weight of the laundry is detected.

In addition, the period of time required for washing may include a remaining time which is a remaining operation time of the clothes treatment apparatus indicating a time difference between a time, on which a washing program is selected, and a time for completing the washing.

The display 220 may display a washing program and an option selected by the user.

The display 220 may display whether the washing is to be performed or not to be allowed, and when the washing is not allowed, the display 220 may display a washable time and an error code.

The display 220 includes a plurality of seven segments.

The display 220 may include a flat panel display such as a liquid crystal display (LCD), and may further include a light emitting diode (LED).

Figure 4:
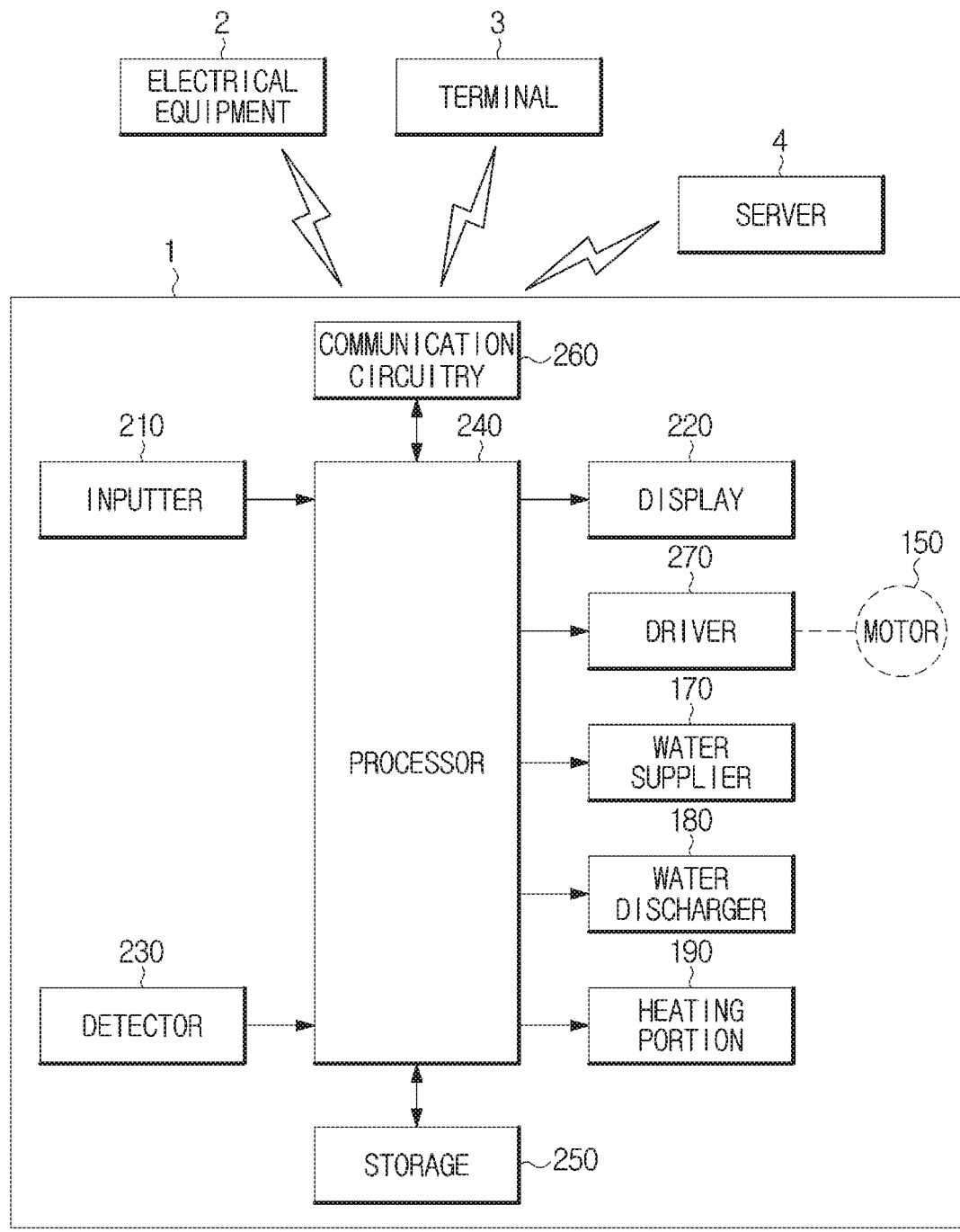
FIG. 4 is a block diagram of the clothes treatment apparatus according to an embodiment of the disclosure.

FIG. 4 is a block diagram of the clothes treatment apparatus according to an embodiment of the disclosure.

An example of the clothes treatment apparatus according to an embodiment will be described with reference to a washing machine.

The washing machine includes a water supplier 170, a water discharger 180, a heating portion 190, an inputter 210, a display 220, a detector 230, a processor 240, a storage 250, a communication circuitry 260 and a driver 270.

The water supplier 170 supplies water for washing and rinsing according to a control command of the processor 240.

The water discharger 180 discharges water to the outside according to a control command of the processor 240.

The heating portion 190 heats water in the tub according to a control command of the processor 240.

A detail description of the water supplier 170, the water discharger 180, and the heating portion 190 will be omitted.

The inputter 210 receives an operation start command, a pause command, and an operation stop command, receives the washing program, and may further receive at least one option.

The inputter 210 may receive at least one of weather, season, day of the week and date.

The inputter 210 transmits input information input by the user to the processor 240.

The display 220 displays a default time based on the control command of the processor 240, displays a setting time as an operation time after a predetermined period of time elapses, and displays a remaining time during the execution of the washing program.

The predetermined period of time may be a period of time required for detecting the weight of the laundry and identifying the weight of the laundry and the setting time corresponding to the received washing program.

The display 220 may display the washing program and at least one option selected by the user.

Figure 5:
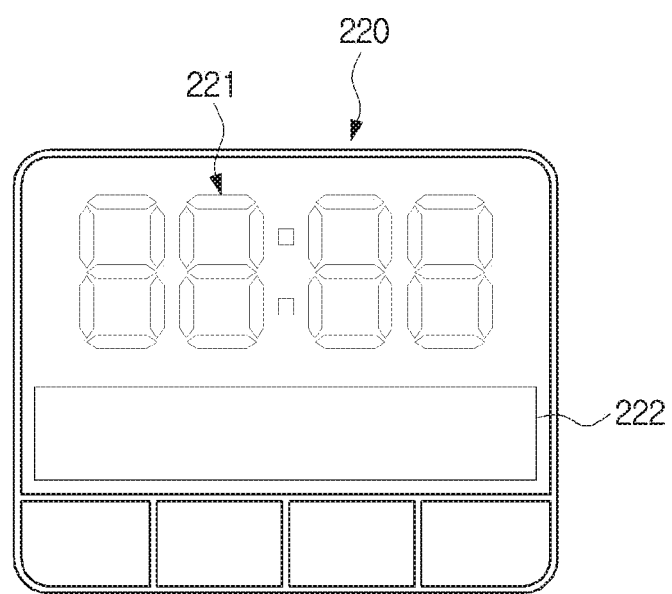
FIG. 5 is a view of a display of the clothes treatment apparatus according to an embodiment of the disclosure.

As illustrated in FIG. 5, the display 220 may include a time display 221 configured to display one of the default time, the operation time or the remaining time, and an operation information display 222 configured to display a washing program and at least one option which are selected by the user.

The detector 230 includes a weight detector configured to detect the weight of the laundry.

The detector 230 may be a sensor configured to detect at least one piece of input information and output information of the motor 150 configured to apply a rotational force to the drum when the drum rotates based on a control command of the processor 240. For example, the detector 230 may sense at least one of the current, the voltage, the torque, and the number of revolutions of the motor 150.

Upon receiving a washing program input via the inputter 210, the processor 240 identifies the weight estimation information of the laundry at present (i.e., today), and identifies a default time corresponding to the received washing program and the weight estimation information of the laundry, based on the information stored in the storage 250 and allows the display of the identified default time.

Alternatively, upon receiving a washing program input via the inputter 210, the processor 240 may identify the current weight estimation information of the laundry, and identify a predetermined number of default times, which corresponds to the received washing program and the weight estimation information of the laundry, based on the information stored in the storage 250, calculate an average time of the identified predetermined number of default times and allow the calculated average time to be displayed as the default time.

The predetermined number of default times represents default times counted from a default time that is recently stored and corresponds to a washing program and weight estimation information identical to the received washing program and the current weight estimation information.

The processor 240 includes a timer. When identifying the current weight estimation information of the laundry, the processor 240 may identify the current date and day of the week and identify the current season based on the identified date.

The processor 240 may identify at least one of date, season, weather, and day of the week input to the inputter 210 and further identify at least one of date, season, weather, and day of the week received via the communication circuitry 260.

The processor 240 may transmit the received washing program to a terminal 3 or a server 4 through the communication circuitry 260 based on the washing program being received. The processor 240 may receive the default time from the terminal 3 or the server 4, and allow the display to display the received default time.

Upon receiving washing program and default time request information from the washing machine, the server 4 identifies identification information of the user of the washing machine and obtains a default time, which is stored in a washing machine of the other user having the same condition as the identification information of the identified user, and transmits the obtained default time to the washing machine which requested the default time.

Upon receiving the washing program and at least one option, the processor 240 identifies a default time corresponding to the received washing program, at least one option and the identified weight estimation information of the laundry based on the information stored in the storage 250 and controls the display to display the identified default time.

The weight estimation information of the laundry includes at least one of day of the week, date, season, and weather.

The information stored in the storage 250 may include information on a default time for each piece of weight estimation information of the laundry of each washing program and may further include information on a default time for each piece of weight estimation information of the laundry of each washing program which corresponds to the addition of the option.

In addition, the processor 240 may identify the weight estimation information of the laundry at the time when the washing program is received, the operation start command is received, the option selection information is received, or the power on command is received.

The processor 240 may identify a stop period of the washing machine based on the washing program being received. When it is identified that the identified stop period is a predetermined period or longer, the processor 240 may identify a weight of laundry, which is the greatest among the weight of the laundry detected in the past, and identify a setting time corresponding to the identified weight of the laundry and the received washing program and allow the identified setting time to be displayed as the default time.

Upon receiving the washing program, the processor 240 may identify whether the current date is a holiday or not. When it is identified that the current date is a holiday, the processor 240 may identify a weight of the laundry on the weekends or identify a weight of the laundry, which is the greatest among the weight of the laundry detected in the past, identify a setting time corresponding to the identified weight of the laundry and the received washing program and allow the identified setting time to be displayed as the default time.

Upon receiving the operation start command, the processor 240 identifies the weight of the laundry corresponding to the detection information of the detector 230, identifies a setting time corresponding to the weight of the laundry and the received washing program, and allows the identified setting time to be displayed as an actual operation time on the display.

That is, after detecting the weight of the laundry, the processor 240 controls the operation of the display 220 so that the display 220 changes the default time displayed on the display 220 into the actual operation time and displays the actual operation time.

The processor 240 may allow a washing time change notification to be output on the display 220 or through a speaker (not shown). The washing time change notification represents a notification indicating a change from the default time to the operation time.

The processor 240 updates the information stored in the storage 250 by storing the actual operation time, which corresponds to the received washing program and the detected weight of and the laundry, as the default time in the storage 250.

The actual operation time may be a setting time corresponding to the received washing program and the detected weight of the laundry, or may be an operation time, which is taken when the washing machine is actually operated with the received washing program based on the setting time.

That is, the setting time and the operation time corresponding to the received washing program and the detected weight of the laundry may be identical to each other, or may have an error time that is a predetermined size or less.

When storing the actual operation time as the default time in the storage 250, the processor 240 identifies information, which is among information stored in the storage 250, having the same condition as the received washing program and weight estimation information, and further stores the obtained actual operation time as the default time in the identified information.

In addition, when storing the actual operation time as the default time in the storage 250, the processor 240 may identify a default time having information, which is among information stored in the storage 250 and has the same condition as the received washing program and weight estimation information, and calculate an average time of the identified default time and the obtained actual operation time, and store the calculated average time as a new default time.

In addition, when storing the actual operation time as the default time in the storage 250, the processor 240 may identify a weight of the laundry corresponding to information, which is among information stored in the storage 250, having the same condition as the received washing program and weight estimation information and calculate an average weight of the identified weight of the laundry and the detected weight of the laundry and store the calculated average weight with the average time.

The information having the same condition is information, which is among information stored in the storage 250, having a washing program and weight estimation information of the laundry identical to the received washing program and the identified weight estimation information of laundry.

The processor 240 may identify the weight of the laundry corresponding to the information having the same condition as the received washing program and the weight estimation information, calculate an average weight of the identified weight of the laundry and the detected weight of the laundry, identify a weight level corresponding to the calculated average weight of the laundry, identify a setting time corresponding to the identified weight level, and store the identified setting time as the default time.

For example, when it is assumed that a weight of the laundry of the normal wash on a first Monday is 0.5 kg, a weight of the laundry of the normal wash on a second Monday is 0.6 kg, a weight of the laundry of the normal wash on a third Monday is 1.3 kg, a weight of the laundry of the normal wash on a fourth Monday is 0.7 kg, and a weight of the laundry of the normal wash on a fifth Monday is 0.4 kg, the processor 240 obtains an average weight 0.7 kg of five times, which is a predetermined number of times, and calculates a level 1 corresponding to the obtained average weight and stores a setting time "a" corresponding to the level 1 as the default time.

Accordingly, when the washing machine is operated later under the same washing program and the weight estimation information, the processor 240 may allow an actual operation time, which is currently obtained, to be displayed as the default time.

When the setting time corresponding to the received washing program and the detected weight of laundry is displayed as the operation time, the processor 240 may identify the weight level corresponding to the weight of the laundry, and identify a setting time corresponding to the identified weight level and the washing program, and allow the identified setting time to be displayed as an actual operation time. The operation time display on the display may be a remaining operation time of the washing machine.

The processor 240 re-identifies the weight of the laundry corresponding to the detection information detected by the detector 230 during the execution of the washing program. When it is identified that the weight of the laundry, which is re-identified, is different from the weight of the laundry, which is detected upon detecting the weight, the processor 240 obtains a remaining time based on a remaining cycle in the received washing program and the re-identified weight of the laundry, and allows the display to display the obtained remaining time.

The processor 240 may re-identify the weight of the laundry before at least one of the wash cycle, the rinse cycle, the dewatering cycle and the dry cycle is performed, or after at least one of the wash cycle, the rinse cycle, the dewatering cycle and the dry cycle is completed.

When the operation start command is received, the processor 240 may control an operation of the water supplier 160, the heating portion 190, the water discharger 180, and a blower (not shown) based on the received washing program and the at least one option so as to perform the wash cycle, the rinse cycle, the dewatering cycle and the dry cycle corresponding to the selected washing program and the at least one option.

The processor 240 controls the operation of the display 220 to display the washing program and at least one option selected by the user.

Particularly, during the execution of the washing program, the processor 240 identifies a weight of the laundry corresponding to the detection information detected by the detector 230 and controls the wash cycle and the rinse cycle by regulating the amount of water based on the identified weight of the laundry and the washing program selected by the user, and controls the dewatering cycle based on the identified weight of the laundry and the washing program.

When the washing program selected by the user includes the dry cycle, the processor 240 may control the dry cycle based on the weight of the laundry.

During the wash cycle and the rinse cycle, the processor 240 controls the operation of the water supplier 160, the motor 150 and the water discharger 180 and further controls the operation of the heating portion 190 based on the selected water temperature. During the dewatering cycle, the processor 240 controls the operation of the motor 150 and the water discharger 180, and during the dry cycle, the processor 240 controls the operation of the motor 150, the heating portion 190 and the blower (not shown).

The storage 250 may store the setting time for each washing program corresponding to the weight of the laundry.

The storage 250 may store a plurality of weight level corresponding to a plurality of weight ranges of the laundry, and store a setting time for each washing program corresponding to each weight level. The setting time for each washing program corresponding to each weight level may be stored as a look-up table.

As illustrated in FIG. 6, the storage 250 may store the setting time for each weight level of the normal washing program. Among the setting time, "a" may be the shortest time and "e" may be the longest time. The length of time may be a<b<c<d<e.

The weight of the laundry may be stored as a weight level corresponding to each weight range.

For example, the weight of the laundry in a range of 0 to 1 kg may be stored as a weight level 1, the weight of the laundry in a range of 1.1 to 2 kg may be stored as a weight level 2, the weight of the laundry in a range of 2.1 to 3 kg may be stored as a weight level 3, the weight of the laundry in a range of 3.1 to 4 kg may be stored as a weight level 4, and the weight of the laundry in a range of 4.1 to 5 kg may be stored as a weight level 5. The weigh level corresponding to the weight range of the laundry is merely an example and thus it may be various depending on the type, model, and manufacturer of the clothes treatment apparatus.

The storage 250 stores a default time corresponding to at least one washing program selected by the user and the weight estimation information of the laundry.

The default time corresponding to at least one of the washing programs and the weight estimation information of the laundry may be operation information of the washing machine, which is previously operated with a washing program selected by the user, and may be an actual operation time of the washing machine, which is operated according to a weight of laundry put into the drum and according to a washing program selected by the user.

For example, the washing program may include normal wash, bedding wash, boiling, wool wash, towel wash, and quick wash.

The weight estimation information of the laundry may be factors influencing the change in the weight depending on the amount of laundry to be washed by the user.

The weight estimation information of the laundry is information for estimating the weight of the laundry contained in the drum of the washing machine, and may include at least one of day, date, season, weather, and room temperature. In addition, the weight estimation information of the laundry may further include the number of family members, age and sex of the user.

The storage 250 stores the default time corresponding to the at least one washing program selected by the user and the weight estimation information of the laundry, but particularly may store the default time corresponding to the weight estimation information of the laundry on a predetermined number of washing programs, which is performed on the closest time to the current time (i.e., the latest).

For example, the storage 250 may store a default time of normal wash for each day of the week, a default time of normal wash for each weather, a default time of normal wash for each season, a default time of normal wash for each date, a default time of wool wash for each day of the week, a default time of wool wash for each weather, a default time of wool wash for each season, a default time of wool wash for each date, a default time of bedding wash for each day of the week, a default time of bedding wash for each weather, a default time of bedding wash for each date, and a default time of bedding wash for each season. The storage 250 may store a default time of each washing program for each room temperature.

The storage 250 stores the default time corresponding to the at least one washing program selected by the user and the weight estimation information of the laundry. The storage 250 may further store the weight estimation information of the laundry and the weight of the laundry for each of a predetermined number of washing programs, which is performed on the closest time from the current time (i.e., the latest) and store the default time together.

As illustrated in FIG. 7, the storage 250 may store the weight level of the normal wash for each day of the week by a predetermined number of times. The information of the predetermined number of times is the weight level related to the normal wash that is recently performed.

As shown in FIGS. 8A and 8B, the storage 250 stores the weight level of the normal wash for each season.

That is, as illustrated in FIG. 8A, the storage stores the weight level of the laundry of summer normal wash for each day of the week, and as illustrated in FIG. 8B, the storage stores the weight level of the laundry of winter normal wash for each day of the week.

The storage 250 may store the weight of the laundry corresponding to at least one washing program selected by the user, at least one option selected by the user, and the weight estimation information of the laundry. The weight of the laundry may be a weight level.

For example, the storage 250 may store a default time corresponding to one additional rinse of the normal wash, a default time corresponding to one additional rinse of the wool wash, and a default time corresponding to one additional rinse of the bedding wash.

As another example, the storage 250 may store a default time of the normal wash for each day of the week corresponding to one additional rinse, a default time of the wool wash for each day of the week corresponding to one additional rinse, and a default time of the normal wash for each day of the week corresponding to one additional rinse.

The storage may store a plurality of pieces of weight estimation information and a plurality of a default time for each washing program. For example, the plurality of pieces of weight estimation information may include at least two of date, day of the week, weather, and season.

The storage 250 may store the default time corresponding to at least one washing program selected by the user, at least one option selected by the user, and the weight estimation information of the laundry.

The options include at least one of water temperature, a wash cycle time, the number of rinse cycles, an intensity of dewatering circle and a dewatering cycle time, and may further include at least one of an intensity of dry cycle and a dry cycle time.

As illustrated in FIG. 9, the storage 250 stores date on which the normal wash is performed, the weight level for each date, and the default time, and store together with the day of the week and the weather. The default time may be a setting time corresponding to the weight level of the laundry.

The storage 250 may store information on the weight of the laundry for each condition as a lookup table.

In addition, the storage 250 may store information on the default time for each condition as a lookup table. Conditions include the washing program and the weight estimation information of the laundry, and may further include options.

The storage 250 may store a default time for each day of the week with respect to each washing program and each option, a default time for each date with respect to each washing program and each option, a default time for each season with respect to each washing program and each option, and a default time for each room temperature with respect to each washing program and each option.

The storage 250 may store a default time for each day of the week with respect to each washing program and each season, a default time for each date with respect to each washing program and each season, and a default time for each room temperature with respect to each washing program and each season.

With respect to the weight of the laundry, the storage 250 may store additional time for each option about each washing program.

The storage 250 may store the number of family members, sex and age of the user, and may store identification information of the clothes treatment apparatus.

The storage 250 may update basic wash information for various conditions based on a control command of the processor 240.

The storage 250 may include a volatile memory such as a static random access memory (S-RAM) or a dynamic random access memory (D-RAM) for temporarily storing data, and a non-volatile memory such as a read only memory, an erasable programmable read only memory (EPROM), or an electrically erasable programmable read only memory (EEPROM) for storing data for long time.

The communication circuitry 260 includes wired/wireless communication and performs communication with at least one of electrical equipment 2, the terminal 3, and the server 4.

The communication circuitry 260 may receive at least one of day of the week, date, season, weather, room temperature, and room humidity from at least one of the electrical equipment 2, the terminal 3, and the server 4.

The electrical equipment 2 may be a home appliance located in the house and capable of communication. For example, the electrical equipment 2 may be a refrigerator, a television, a microwave oven, an oven, or a dishwasher.

The terminal 3 is a mobile device capable of wired/wireless communication and includes any one of a tablet, a smart phone, and a lap-top computer.

The terminal 3 may store an application (APP) providing weather information, an APP sending and receiving variety of information for washing, and an APP displaying various information that is transmitted and received. The variety of information may include at least one of date, day of the week, season, temperature, and weather information.

The terminal 3 may display the default time for the washing program performed for each day of the week, season, temperature, and weather.

In addition, the terminal 3 may provide weather information, the date, the season, and the day of the week to the washing machine through a single APP and display washing information for washing. The washing information may include a default time for the washing program performed for each day of the week, the season, the temperature, and the weather, and may include operation information of the clothes treatment apparatus.

The communication between the washing machine corresponding to the clothes treatment apparatus 1 and the terminal 3, and the communication between the washing machine corresponding to the clothes treatment apparatus 1 and the electrical equipment 2 includes a communication in the close contact state or within a predetermined distance.

That is, the communication circuitry 260 performs wireless communication such as NFC, RFID, Bluetooth, ZigBee, and WIFI, with the electrical equipment 2 and the terminal 3. In addition, the communication circuitry 260 may perform short-range wireless communication such as NFC, RFID, Bluetooth, and ZigBee, with the electrical equipment 2 and the terminal 3 due to the cost of the communication circuitry.

The server 4 may be a weather server, and may be a washing information providing server that stores identification information of the washing machine corresponding to the clothes treatment apparatus, and identification information of a user, and manages the washing machine corresponding to the clothes treatment apparatus 1.

The identification information of the washing machine may include at least one of the type, model, manufacture number, and manufacturer of the washing machine.

The server 4 provides the washing machine with today or current weather, date, season, and day of the week.

In addition, the server 4 may identify the identification information of the user, group them into users having the same conditions, collect the washing time required for the washing program performed for each day of the week, the season, the temperature, and the weather, obtain a new default time of the washing program performed for each day of the week, the season, the temperature, and the weather, and transmit the obtained default time of the washing program performed for each day of the week, the season, the temperature, and the weather to a washing machine of a user in the same group.

The identification information of the user may include an ID and name of the user, the number of family members of the user, the age of the user, and the sex of the user.

The driver 270 drives the motor 150 based on the control command of the processor 240.

That is, the driver 270 may supply current to the motor 150 based on the control command of the processor 240. For example, the driver 270 may include an inverter circuit configured to supply a driving current, which is calculated based on a speed command of the processor 240 and a rotation speed of the motor 150, to the motor 150.

In addition, the driver 270 may include a power switching circuit configured to allow or block current flow to the motor 150 in response to an on/off command of the processor 240.

Figure 10:
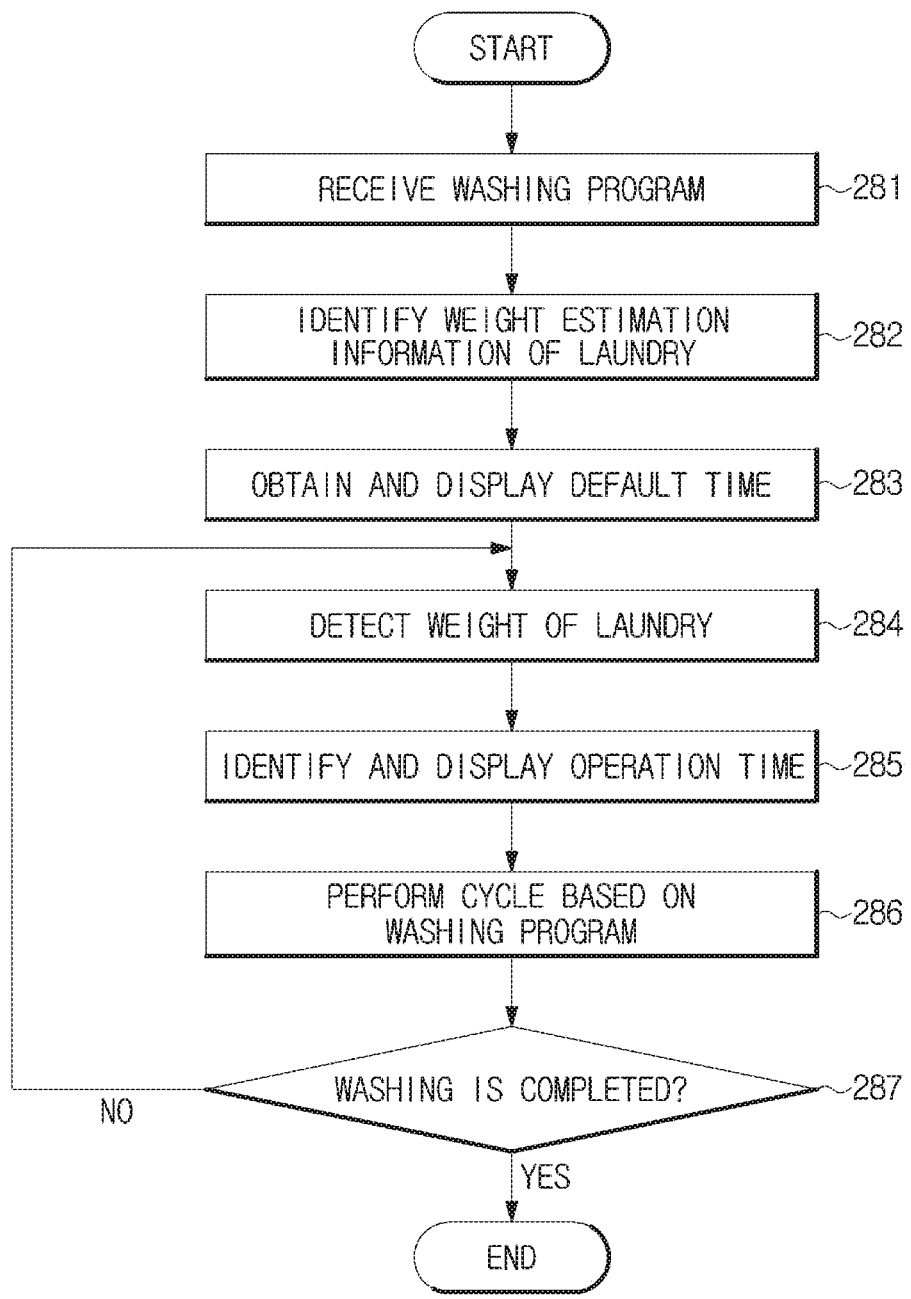
FIG. 10 is a flowchart of the clothes treatment apparatus according to an embodiment of the disclosure.

FIG. 10 is a flowchart of the clothes treatment apparatus according to an embodiment of the disclosure, which will be described with reference to FIGS. 6 to 9.

The washing machine corresponding to the clothes treatment apparatus activates the control panel 200 based on a power on command being input.

Based on the washing program being selected by the user and received (281), the clothes treatment apparatus identifies the current (i.e., today) weight estimation information of the laundry (282).

The identifying of current (i.e., today) weight estimation information of the laundry may include identifying current weight estimation information of the laundry at the time when the washing program is received, the operation start command is received, the option selection information is received, or the power on command is received.

The identifying of the weight estimation information of the laundry may include identifying at least one of the date, the season, the weather, the day of the week, and the room temperature input to the inputter 210, and include identifying at least one of the date, the season, the weather, the day of the week, and the room temperature received through the communication circuitry 260.

That is, the identifying of the weight estimation information of the laundry includes identifying at least one of current (i.e., today) date, season, weather, day of the week, and room temperature.

The washing machine identifies the default time corresponding to the received washing program and the identified weight estimation information of the laundry based on the information stored in the storage 250, and displays the identified default time on the display (283), thereby allowing the user to recognize a period of time required for washing.

This will be described with an example.

When it is identified that the weight estimation information is Monday and the received washing programs is the normal wash, the washing machine identifies the weight of the laundry in the normal wash on Monday among information stored in the storage, and displays the default time corresponding to the identified weight of the laundry on the display.

In addition, when it is identified that the weight estimation information is Monday and the received washing programs is the normal wash, the washing machine may identify the default time of the normal wash on Monday among information stored in the storage, and displays the default time corresponding to the identified weight of the laundry on the display.

This will be described with reference to FIGS. 6 and 7.

As illustrated in FIG. 7, when it is identified that the weight estimation information is Monday and the received washing programs is the normal wash, the washing machine may identify the weight of the laundry in the normal wash on Monday among information stored in the storage, and display the default time corresponding to the identified weight of the laundry on the display.

For example, the washing machine identifies a weight level of the normal wash, which is performed on Monday corresponding to the closest Monday to the current (i.e., the latest Monday), among the weight level of the normal wash performed on Monday, identifies a setting time corresponding to the identified weight level, and displays the identified setting time as a default time. In other words, the washing machine may identify that the weight level of the latest laundry of the normal wash on Monday is the weight level 1 of the number 5 and may display "a" as a default time corresponding to the weight level 1.

As another example, the washing machine identifies a weight level of the weight of the normal wash performed on Monday by a predetermined number, calculates an average level of the predetermined number of the identified weight level of the normal wash, identifies a setting time corresponding to the calculated average weight level and displays the identified setting time as a default time.

The predetermined number of the identified weight level of the normal wash on Monday includes predetermined number of weight level of the normal wash, which is the closest to the present among the weight level of the normal wash on Monday stored in the storage.

For example, when the predetermined number is three, the washing machine may identify the weigh level 1 corresponding to the number 5, the weigh level 1 corresponding to the number 4, and the weigh level 1 corresponding to the number 3, calculate an average level of the identified weight level and display the setting time "a" corresponding to the calculated average level as a default time.

In addition, when the average level has number with decimal points, the washing machine may obtain the level by rounding off the decimal points.

As another example, the washing machine identifies the weight level of the maximum value among the weight levels of the normal wash performed on Monday, identifies a setting time corresponding to the identified weight level, and displays the identified setting time as the default time.

As yet another example, the washing machine identifies the weight level of the minimum value among the weight levels of the normal wash performed on Monday, identifies a setting time corresponding to the identified weight level, and displays the identified setting time as the default time.

In addition, when it is identified that the weight estimation information is Sunday and the received washing program is the normal wash, the washing machine identifies the default time of the normal wash on Sunday and displays the identified default time. In other words, because the amount of the laundry to be washed on the weekends is greater than the amount of the laundry on the weekdays, the washing machine may estimate the weight of the laundry based on the day information.

As another example, when it is identified that it is raining corresponding to the weight estimation information, and the received washing program is the normal wash, the washing machine identifies the default time of the normal wash in the rainy weather and displays the identified default time. When it is identified that it is sunny, and the received washing program is the normal wash, the washing machine identifies the default time of the normal wash in the sunny weather and displays the identified default time.

In other words, because the dry performance is degraded due the high humidity when it is raining, the amount of the laundry may be reduced in the rainy weather. Because the dry performance is increased due the low humidity when it is sunny, the amount of the laundry may be increased in the sunny weather. Therefore, it is possible to estimate the weight of the laundry based on the weather information.

As yet another example, as illustrated in FIGS. 8A and 8B, when it is identified that it is summer corresponding to the weight estimation information, and the received washing program is the normal wash, the washing machine identifies the default time of the normal wash in summer and displays the identified default time. When it is identified that it is winter corresponding to the weight estimation information, and the received washing program is the normal wash, the washing machine identifies the default time of the normal wash in winter and displays the identified default time.

In other words, because winter clothes are thicker than summer clothes, it is possible to estimate the weight of the laundry based on the weather information.

As yet another example, the washing machine identifies a default time corresponding to the plurality of pieces of weight estimation information and the washing program, and display the identified default time. This will be described with reference to FIGS. 8A and 8B.

As illustrated in FIG. 8A, when it is identified that it is Saturday and summer corresponding to the weight estimation information and when the received washing program is the normal wash, the washing machine identifies that the weight level of the laundry on Saturday in summer is 4 and a default time corresponding to the weight level 4 of the received normal wash is "d", and displays the identified default time "d" on the display. The identified default time may be selected according to the setting time corresponding to the weight level.

As illustrated in FIG. 8B, when it is identified that it is Monday and winter corresponding to the weight estimation information and when the received washing program is the normal wash, the washing machine identifies that the weight level of the laundry on Monday in winter is 2 and a default time corresponding to the weight level 2 of the received normal wash is "b", and displays the identified default time "b" on the display.

As yet another example, based on the washing program being received, the washing machine identifies a point of time when the last operation is performed, identifies the stop period of the clothes treatment apparatus between the identified last time and the current time. When it is identified that the identified stop period is a predetermined period or more, the washing machine may identify the weight of the laundry that is the greatest among the weight of the laundry detected in the past, identify the setting time corresponding to the identified weight of the laundry and the received washing program, and display the identified setting time as a default time. This will be described with reference to FIG. 9.

It is assumed that the predetermined period is six days.

As illustrated in FIG. 9, when the washing program is received on Thursday, $16^{th}$ (today), the washing machine identifies a date on which the last operation is operated. When it is identified that the date of the last operation is on Wednesday, $8^{th}$, the washing machine may identify that the stop period of the clothes treatment apparatus is eight days. When it is identified that the stop period of the clothes treatment apparatus is six days or more, the washing machine may identify that the highest level among the weight level of the laundry detected in the past is five and display a default time "e" corresponding the level 5 of the normal wash program on the display.

Upon receiving the washing programs, the washing machine may transmit a request command for providing the received washing program and the default time, to at least one of the terminal 3 or the server 5, and upon receiving the default time from at least one of the terminal 3 or the server 5, the washing machine may display the received default time.

Upon receiving the washing program and at least one option, the washing machine identifies a default time corresponding to the received washing program, at least one option and the identified weight estimation information of the laundry based on the information stored in the storage 250 and displays the identified default time on the display.

The information stored in the storage 250 may include information on a default time corresponding to each piece of weight estimation information of the laundry for each washing program and may further include information on a default time corresponding to each piece of weight estimation information of the laundry for each option of the washing program.

For example, when it is Monday corresponding to the weight estimation information of the laundry and the received washing program is the normal wash and the option is one additional rinse, the washing machine identifies a default time corresponding to the normal wash on Monday and one additional rinse, and displays the identified default time.

As another example, when it is Monday corresponding to the weight estimation information of the laundry and the received washing program is the normal wash and the option is additional 5 minutes of dewatering time, the washing machine identifies a default time corresponding to the normal wash on Monday and additional 5 minutes of dewatering time, and displays the identified default time.

As yet another example, when it is Monday corresponding to the weight estimation information of the laundry and the received washing program is the normal wash and the option is additional 3 minutes of washing time and additional 5 minutes of dewatering time, the washing machine identifies a default time corresponding to the normal wash on Monday and additional 3 minutes of washing time and additional 5 minutes of dewatering time, and displays the identified default time.

According to the operation start command being received, the washing machine detects an actual weight of the laundry by rotating the drum 140 while displaying the default time on the display (284).

The identification of the actual weight of the laundry includes detecting at least one piece of input-output information of the motor 150 configured to apply the rotational force to the drum 140 and detecting a weight of the laundry based on the detected at least one piece of information.

The washing machine identifies the weight level corresponding to the detected actual weight of the laundry, and displays an actual operation time corresponding to the identified level and the received washing program on the display (285).

The identification of the actual operation time includes identifying a setting time corresponding to the detected weight level among the weight level of the received washing program, and identifying the identified setting time. The identified setting time may be an actual operation time.

In addition, based on the option being selected, the washing machine may identify the weight level corresponding to the detected actual weight of the laundry, identify an actual operation time corresponding to the identified weight level, the received wash program and the selected option, and display the identified actual operation time on the display.

That is, the washing machine changes the default time displayed on the display 220 into the actual operation time and then displays the actual operation time. This will be described with reference to FIGS. 11 and 12.

The washing machine displays the default time corresponding to the received washing program and the weight estimation information of the laundry on the display, and when the actual weight of the laundry contained in the drum is detected, the washing machine displays the actual operation time corresponding to the detected actual weight of the laundry and the received washing program on the display and outputs a sound indicating that a time, which is displayed on the display, is changed.

Figure 11:
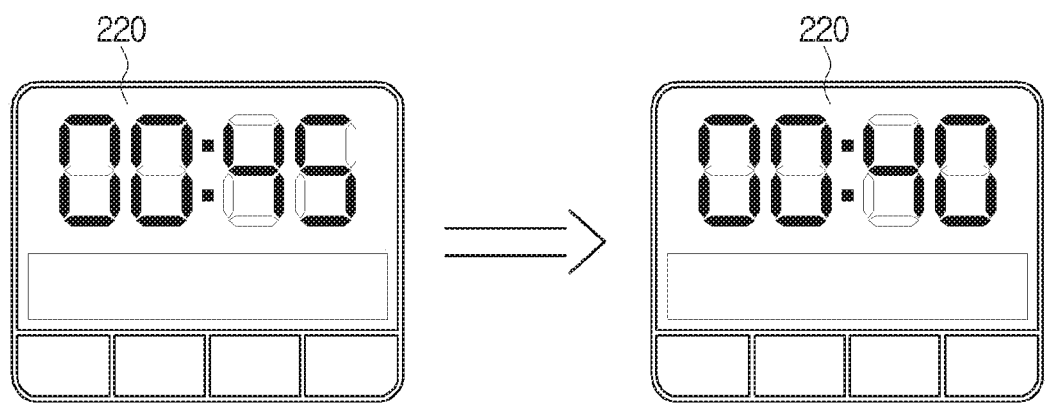
FIG. 11 is a view illustrating a washing time displayed on the display of the clothes treatment apparatus according to an embodiment of the disclosure.

As illustrated in FIG. 11, when the actual weight of the laundry detected by the detector is less than an estimated weight of the laundry corresponding to the weight estimation information, the washing machine may display an actual operation time, which is reduced in comparison with the default time, on the display.

Figure 12:
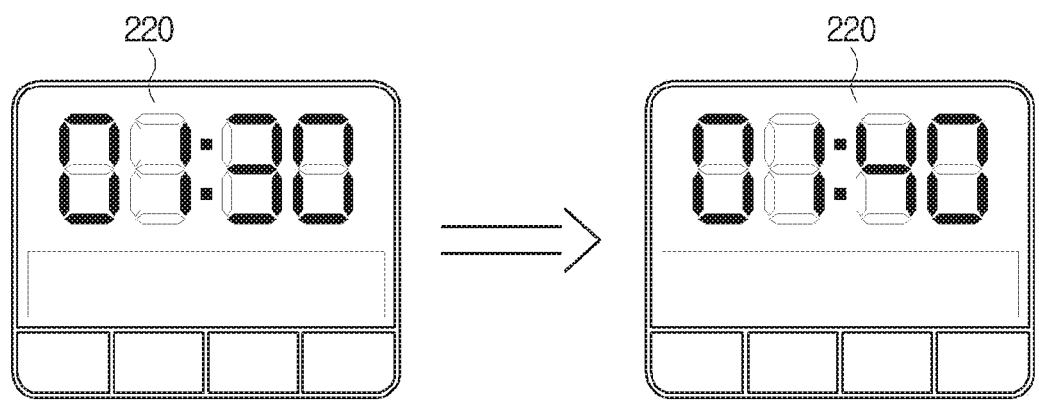
FIG. 12 is a view illustrating a washing time displayed on the display of the clothes treatment apparatus according to an embodiment of the disclosure.

As illustrated in FIG. 12, when the actual weight of the laundry detected by the detector is greater than an estimated weight of the laundry corresponding to the weight estimation information, the washing machine may display an actual operation time, which is increased in comparison with the default time, on the display.

Because the default time of the washing machine is displayed based on the weight estimation information of laundry, the default time may not be significantly different from the actual operation time.

When the detection of the weight of the laundry is completed, the washing machine performs at least one of the wash cycle, the rinse cycle, the dewatering cycle and the dry cycle based on the detected weight of the laundry and the received washing program (286).

In addition, when the option is selected and the detection of the weight of the laundry is completed, the washing machine performs at least one of the wash cycle, the rinse cycle, the dewatering cycle and the dry cycle based on the detected weight of the laundry, the received washing program, and the selected option.

The washing machine re-identifies the weight of the laundry corresponding to the detection information detected by the detector 230 during the execution of any one cycle. The washing machine identifies whether the weight of the laundry, which is re-identified, is different from the weight of the laundry, which is detected upon detecting the weight. When it is identified that two weights of the laundry is different from each other, the washing machine obtains a remaining time based on a remaining cycle in the received washing program and the re-identified weight of the laundry, and displays the remaining time.

The detection of the weight of the laundry during the execution of any one cycle may include re-detecting the weight of the laundry before at least one of the wash cycle, the rinse cycle, the dewatering cycle and the dry cycle is performed, or after at least one of the wash cycle, the rinse cycle, the dewatering cycle and the dry cycle is completed.

The wash cycle includes water supplying, washing, draining and intermediate dewatering, and the rinse cycle includes water supplying, washing, draining and intermediate dewatering. The dewatering cycle includes final dewatering.

For example, when re-detecting the weight of the laundry before performing the intermediate dewatering in one of the wash cycle and the rinse cycle or when re-detecting the weight of the laundry before performing the final dewatering, the washing machine may detect the weight of the laundry in a wet-state, and identify an actual weight of the laundry corresponding to the detected weight of the laundry based on the information stored in the storage.

As another example, when re-detecting the weight of the laundry after performing the intermediate dewatering in one of the wash cycle and the rinse cycle, the washing machine may detect the weight of the laundry in a dewatered-state, and identify an actual weight of the laundry corresponding to the detected weight of the laundry.

As yet another example, when re-detecting the weight of the laundry after performing the final dewatering, or before performing the dry cycle, the washing machine may detect the weight of the laundry in the dewatered-state, and identify an actual weight of the laundry.

In addition, when detecting the weight of the laundry before the operation, the washing machine may detect the weight of the laundry after soaking the laundry in the drum by controlling the water supply.

The detection of the weight of the laundry is to identify whether the user additional puts laundry via the auxiliary door. Further, the detection of the weight of the laundry may be to identify whether the user takes out laundry via the auxiliary door.

For example, the washing machine detects the weight of the laundry before the rinse cycle is performed when the wash cycle is completed. When the weight of the laundry is identified to be larger than that before the wash cycle, the washing machine identifies an increase in the water supply time for increasing the amount water for the rinse and identifies an additional time caused by the additional rinse. The washing machine adjusts a remaining time from the rinse cycle to the dewatering cycle or from the rinse cycle to the dry cycle based on the selected additional time, and displays the adjusted remaining time.

That is, the clothes treatment apparatus may display the remaining time by adjusting the remaining time according to the weight change of the laundry during operation.

The clothes treatment apparatus performs the washing operation based on the received washing program and at least one option while detecting the weight of the laundry until all the cycle corresponding to the received washing program are completed (287).

When the execution of the washing program is completed, the washing machine displays the actual operation time as the remaining time of the operation of the washing machine, and stores the detected weight of the laundry, the actual operation time, and the received washing program in the storage.

In addition, upon the completion of the detection of the weight of the laundry, it may be possible to store the detected weight of the laundry, the actual operation time, and the received washing program in the storage.

The storing of the variety of information in the storage may include identifying washing programs and weight estimation information, which is among information stored in the storage, having the same conditions as the received washing program and the current weight estimation information, changing the default time corresponding to the identified washing program and weight estimation information into an actual operation time and storing the actual operation time, and changing the weight of the laundry corresponding to the stored default time into the detected weight of the laundry and storing the detected weight of the laundry.

For example, when the received washing program is the normal wash, the weight estimation information is Monday, and the detected weight of the laundry is the weight level 2, the washing machine may store the weight level 2 of the laundry of the normal wash on Monday in the number 6 in the table of FIG. 7 and further store a default time "b" corresponding to the weight level 2.

The storing of the variety of information in the storage may include identifying washing programs and weight estimation information, which is among information stored in the storage, having the same conditions as the received washing program and the current weight estimation information, obtaining an average time of the default time corresponding to the identified washing program and the weight estimation information and the actual operation time, storing the obtained average time as a new default time, obtaining an average weight of the weight of the laundry corresponding to the stored default time and the detected weight of the laundry, changing the obtained average weight into a weight of the laundry corresponding to the new default time and storing the weight of the laundry.

The storing of the variety of information in the storage may include identifying a plurality of washing programs and a plurality of pieces of weight estimation information, which is among information stored in the storage, having the same conditions as the received washing program and the current weight estimation information, identifying a plurality of default times corresponding to the identified plurality of washing programs and plurality of pieces of weight estimation information, changing an average time of the identified plurality of default times and the actual operation time, into a new default time and storing the new default time, obtaining an average weight of the plurality of weight of the laundry corresponding to the plurality of default times and the detected weight of the laundry, changing the obtained average weight into a weight of the laundry corresponding to the new default time and storing the weight of the laundry.

Further, the washing machine may identify the weight of the laundry corresponding to the information having the same condition, obtain an average weight of the identified weight of the laundry and the detected laundry, identify the weight level corresponding to the obtained average weight of the laundry, identify a setting time corresponding to the identified weight level and store the identified setting time as a default time.

The information having the same condition is information, which is among the information stored in the storage 250, having the same washing program and weight estimation information as the received washing program and the identified weight estimation information.

Further, based on the option being selected, the washing machine displays the actual operation time, and stores the detected weight of the laundry, the actual operation time, the received washing program, and the selected option in the storage.

As mentioned above, the washing machine updates the information stored in the storage 250 by storing the actual operation time corresponding to the received washing program and the current weight estimation information of the laundry, as the default time in the storage 250.

Accordingly, when being operated later under the same washing program and weight estimation information, the washing machine may allow a default time to be displayed by using an actual operation time, which is currently obtained.

Figure 13:
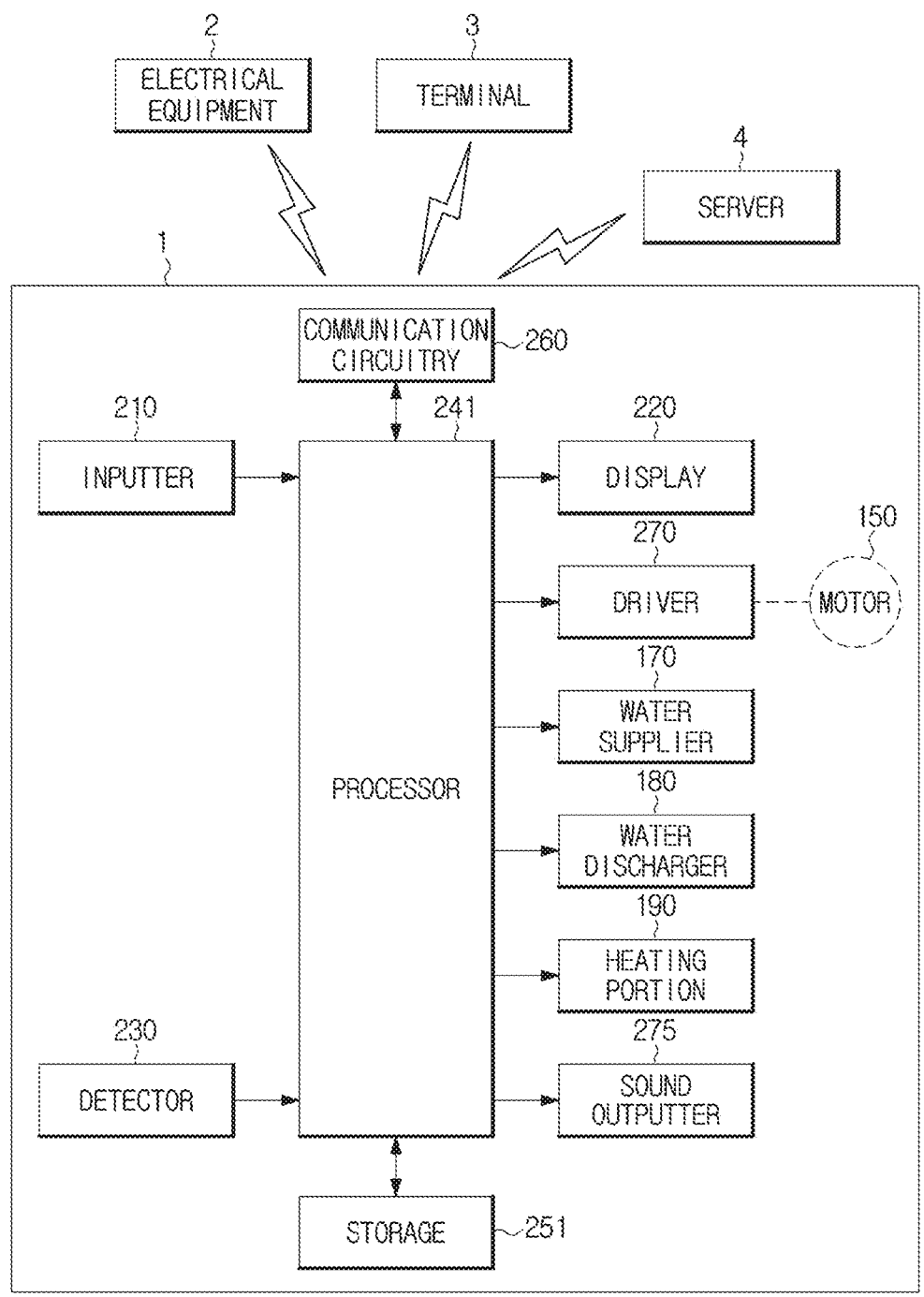
FIG. 13 is a block diagram of a clothes treatment apparatus according to another embodiment of the disclosure.

FIG. 13 is a block diagram of a clothes treatment apparatus according to another embodiment of the disclosure. A washing machine will be described as an example of a clothes treatment apparatus according to another embodiment of the disclosure.

A washing machine according to another embodiment includes a water supplier 170, a water discharger 180, a heating portion 190, an inputter 210, a display 220, a detector 230, a processor 241, a storage 251, a communication circuitry 260, a driver 270, and a sound outputter 275.

The water supplier 170, the water discharger 180, the heating portion 190, the inputter 210, the display 220, the detector 230, the processor 241, the storage 251, the communication circuitry 260, and the driver 270 according to another embodiment are the same as the water supplier 170, the water discharger 180, the heating portion 190, the inputter 210, the display 220, the detector 230, the processor 240, the storage 250, the communication circuitry 260, and the driver 270 according to an embodiment and thus a description thereof will be omitted.

According to the control command of the processor 241, the sound outputter 275 outputs a sound informing the change of the time displayed on the display.

In other words, when the default time displayed on the display is changed into the setting time, the sound outputter 275 outputs notification information indicating time change, as a sound. The notification information may include a beep sound, a melody, and a ring tone.

In addition, the sound outputter 275 may output a sound indicating the change in the remaining time according to the addition of clothes during the execution of the washing program selected by the user.

The sound outputter 275 may include a speaker.

Upon receiving the washing program input via the inputter 210, the processor 241 obtains the default time corresponding to the received washing program based on the information stored in the storage 251 and controls the display of the obtained default time.

An example of obtaining the default time corresponding to the received washing program will be described.

For example, the processor 241 obtains the default time corresponding to the received washing program, among the default times for each the washing program stored in the storage 251, obtains the most recently stored default time among the obtained default times, and controls the display of the obtained default time.

As another example, the processor 241 obtains the default time corresponding to the received washing program, among the default times for each the washing program stored in the storage 251, calculates an average time of the obtained default times, obtains the calculated average time as the default time, and allows the obtained default time to be displayed.

As yet another example, the processor 241 obtains the default time corresponding to the received washing program, among the default times for each the washing program stored in the storage 251, particularly, obtains a predetermined number of default time, which is the recently stored default time, calculates an average time of the obtained default times, obtains the calculated average time as the default time, and allows the obtained default time to be displayed.

As yet another example, the processor 241 obtains the default time corresponding to the received washing program, among the default times for each the washing program stored in the storage 251, obtains the longest default time among the obtained default times and allows the obtained default time to be displayed.

As yet another example, the processor 241 obtains the default time corresponding to the received washing program, among the default times for each the washing program stored in the storage 251, obtains the shortest default time among the obtained default times and allows the obtained default time to be displayed.

The processor 241 may transmit the received washing program to a terminal 3 or a server 4 through the communication circuitry 260 based on the washing program being received. The processor 240 may receive the default time from the terminal 3 or the server 4, and control the display to allow the received default time to be displayed.

Upon receiving the washing program and default time request information from the washing machine, the server 4 identifies identification information of the user of the washing machine and obtains a default time, which is stored in a washing machine of the other user having the same condition as the identification information of the identified user, and transmits the obtained default time to the washing machine which requested the default time.

Upon receiving the washing program and at least one option, the processor 241 obtains a default time corresponding to the received washing program and at least one option based on the information stored in the storage 250 and controls the display to display the obtained default time.

The information stored in the storage 251 may include information on a default time for each washing program and may further include information on a default time for each washing program which corresponds to the addition of the option.

In addition, the processor 241 may obtain a default time at the time when the washing program is received, the start command is received, the option selection information is received, or the power on command is received.

Upon receiving the start command, the processor 240 identifies the weight of the laundry corresponding to the detection information of the detector 230, identifies a setting time corresponding to the weight of the laundry and the received washing program, and allows the identified setting time to be displayed as an actual operation time on the display.

That is, after detecting the weight of the laundry, the processor 241 controls the operation of the display 220 so that the display 220 changes the default time displayed on the display 220 into the actual operation time and displays the actual operation time.

The processor 241 may allow time change notification information displayed on the display to be output on the display 220 or through the sound outputter 275. The time change notification information represents notification information indicating a change from the default time to the actual operation time.

The processor 241 updates the information stored in the storage 251 by storing the actual operation time, which corresponds to the received washing program, as the default time in the storage 251.

The processor 241 updates the information stored in the storage 251 by identifying the same washing program as the received washing program among the information stored in the storage 251 and cumulatively storing the actual operation time as the default time information of the identified washing program.

Accordingly, when the washing machine is operated later under the same washing program, the processor 240 may allow the actual operation time, which is currently obtained, to be displayed as the default time.

When storing the actual operation time as the default time in the storage 251, the processor 241 may identify information having the same condition as the received washing program, among the information stored in the storage 251, identify a default time of the identified washing program, calculate an average time of the identified default time and the obtained actual operation time, and store the calculated average time as the default time.

In addition, when storing the actual operation time as the default time in the storage 251, the processor 241 may identify a weight of laundry having information, which has the same condition as the received washing program and calculate an average weight of the identified weight of laundry and the detected weight of laundry, and store the calculated average weight together with the average time.

When storing the actual operation time as the default time in the storage 251, the processor 241 may identify the weight of the laundry of the washing program, which is the same as the received washing program, among the information stored in the storage 251, calculate an average weight of the identified weight of the laundry and the detected weight of the laundry, identify a weight level corresponding to the calculated average weight of laundry, identify a setting time corresponding to the identified weight level, and store the identified setting time as a default time.

For example, when it is assumed that a weight of laundry of the first normal wash is 0.5 kg, a weight of laundry of the second normal wash is 0.6 kg, a weight of laundry of the third normal wash is 1.3 kg, a weight of laundry of the fourth normal wash is 0.7 kg, and a weight of laundry of the fifth normal wash is 0.4 kg, the processor 241 obtains an average weight 0.7 kg of five times, which is a predetermined number of times, and calculates a level 1 corresponding to the obtained average weight and stores a setting time "a" corresponding to the level 1 as the default time.

When displaying the actual operation time after detecting the weight of the laundry, the processor 241 may identify the weight level corresponding to the weight of the laundry, and identify a setting time corresponding to the identified weight level and the washing program, and allow the identified setting time to be displayed as an actual operation time.

The processor 241 re-identifies the weight of the laundry corresponding to the detection information detected by the detector 230 during the execution of the washing program. When it is identified that the weight of the laundry, which is re-identified, is different from the weight of the laundry, which is detected upon detecting the weight, the processor 241 obtains a remaining time based on a remaining cycle in the received washing program and the re-identified weight of the laundry, and allows the display to display the obtained remaining time.

According to a change in the weight of the laundry, the processor 241 may output notification information indicating that the remaining time is changed, as a sound through the sound outputter 275.

The change in the weight of the laundry includes increasing or decreasing the weight of the laundry.

The processor 241 may re-identify the weight of the laundry before at least one of the wash cycle, the rinse cycle, the dewatering cycle and the dry cycle is performed, or after at least one of the wash cycle, the rinse cycle, the dewatering cycle and the dry cycle is completed.

Based on the operation start command being received, the processor 241 may control an operation of the water supplier 160, the heating portion 190, the water discharger 180, a blower (not shown) and the motor 150 based on the received washing program and option so as to perform the wash cycle, the rinse cycle, the dewatering cycle and the dry cycle corresponding to the selected washing program and the at least one option.

Particularly, during the wash cycle, the processor 241 identifies a weight of laundry corresponding to detection information detected by the detector 230 and controls the wash cycle and the rinse cycle by regulating the amount of water based on the identified weight of the laundry and the washing program selected by the user, and controls the dewatering cycle based on the identified weight of the laundry and the washing program.

When the washing program selected by the user includes the dry cycle, the processor 241 may control the dry cycle based on the weight of the laundry.

During the wash cycle and the rinse cycle, the processor 241 controls the operation of the water supplier 160, the motor 150 and the water discharger 180 and further controls the operation of the heating portion 190 based on the selected water temperature. During the dewatering cycle, the processor 241 controls the operation of the motor 150 and the water discharger 180, and during the dry cycle, the processor 241 controls the operation of the motor 150, the heating portion 190 and the blower (not shown).

The processor 241 allows the operation of the display 220 to display the washing program and at least one option selected by the user.

The storage 251 may store the setting time for each weight of the laundry in each washing program. For example, the washing program may include the normal wash, the bedding wash, boiling, the wool wash, the towel wash, and the quick wash.

The storage 251 may store a plurality of weight level (for example, large, medium, and small) corresponding to a plurality of weight ranges of the laundry, and store a setting time for each washing program corresponding to each weight level.

As illustrated in FIG. 14, the storage 251 stores setting times corresponding to the weight levels of the normal wash, such as large, medium, and small, setting times corresponding to the weight levels of the wool wash, such as large, medium, and small, and setting times corresponding to the weight levels of the bedding wash, such as large, medium, and small.

In addition, the storage 251 may store a cycle performance time for each cycle of the washing program corresponding to the weight level.

The storage 251 stores at least one washing program selected by the user and the actual operation time of the at least one washing program. The stored actual operation may be stored as the default time.

The storage 251 may store operation information of at least one washing program selected by the user, by date.

As illustrated in FIG. 15, the storage 251 may store a date on which the washing machine is operated, at least one program, which is selected by the user, for each date, a weight level of the laundry, which is detected upon executing the selected program, and an actual operation time of the washing machine corresponding to the weight level. The actual operation time may be stored as the default time.

Whenever the washing machine is operated, the storage 251 accumulates operation information of the washing program, which is selected by the user, and stores the accumulated operation information.

In addition, the storage 251 may store a predetermined number of pieces of operation information of the washing program, which is selected by the user, and the predetermined number is based on the latest date.

The storage 251 may accumulate the actual operation time for each washing program, and may store the accumulated actual operation time, and store the actual operation time for each washing program together with date. The actual operation time may be stored as the default time.

Figure 16A:
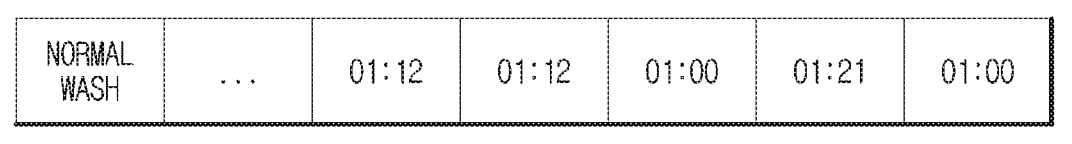
Figure 16B:
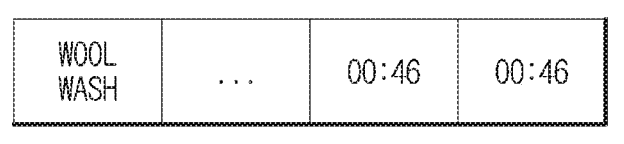

As illustrated in FIG. 16A, the storage 251 may accumulate and store the actual operation time of the normal wash. As illustrated in FIG. 16B, the storage 251 may accumulate and store the actual operation time of the wool wash.

The storage 251 may store information on the default time for each washing program as a lookup table. The default time may be a time based on the operation time.

According to the control command of the processor 240, the storage 251 may update the information on the default time for each washing program.

The storage 251 may store the default time corresponding to at least one washing program selected by the user, and at least one option selected by the user.

The options include at least one of water temperature, a wash cycle time, the number of rinse cycles, an intensity of dewatering circle and a dewatering cycle time, and may further include at least one of an intensity of dry cycle and a dry cycle time.

The storage 251 may store at least one washing program selected by the user and store the weight of the laundry, which is detected upon the execution of the washing program.

The storage 251 may store the number of family members, sex and age of the user, and may store identification information of the clothes treatment apparatus.

The storage 251 may include a volatile memory such as a static random access memory (S-RAM) or a dynamic random access memory (D-RAM) for temporarily storing data, and a non-volatile memory such as a read only memory, an erasable programmable read only memory (EPROM), or an electrically erasable programmable read only memory (EEPROM) for storing data for long time.

The communication circuitry 260 includes wired/wireless communication and performs communication with at least one of electrical equipment 2, the terminal 3, and the server 4.

The electrical equipment 2 may be a home appliance located in the house and capable of communication. For example, the electrical equipment 2 may be a refrigerator, a television, a microwave oven, an oven, or a dishwasher.

The terminal 3 is a mobile device capable of wired/wireless communication and includes any one of a tablet, a smart phone, and a lap-top computer.

The terminal 3 may store an application (APP) providing the default time for each washing program.

The terminal 3 may display the default time for each washing program.

In addition, the terminal 3 may provide washing information for washing through a single APP. The washing information may include a default time for the washing program performed for each date, and operation information of the washing machine.

The communication between the washing machine corresponding to the clothes treatment apparatus 1 and the terminal 3, and the communication between the washing machine corresponding to the clothes treatment apparatus 1 and the electrical equipment 2 includes a communication in the close contact state or within a predetermined distance.

That is, the communication circuitry 260 performs wireless communication such as NFC, RFID, Bluetooth, ZigBee, and WIFI, with the electrical equipment 2 and the terminal 3. In addition, the communication circuitry 260 may perform short-range wireless communication such as NFC, RFID, Bluetooth, and ZigBee, with the electrical equipment 2 and the terminal 3 due to the cost of the communication circuitry.

The server 4 may be a washing information providing server that stores identification information of the washing machine corresponding to the clothes treatment apparatus 1, and identification information of a user, and manages the washing machine corresponding to the clothes treatment apparatus 1.

The identification information of the user may include the ID and name of the user, the number of family members of the user, the age of the user, and the sex of the user.

The identification information of the washing machine may include at least one of the type, model, manufacture number, and manufacturer of the washing machine.

The server 4 provides the washing machine with the default time for each washing program.

Figure 17:
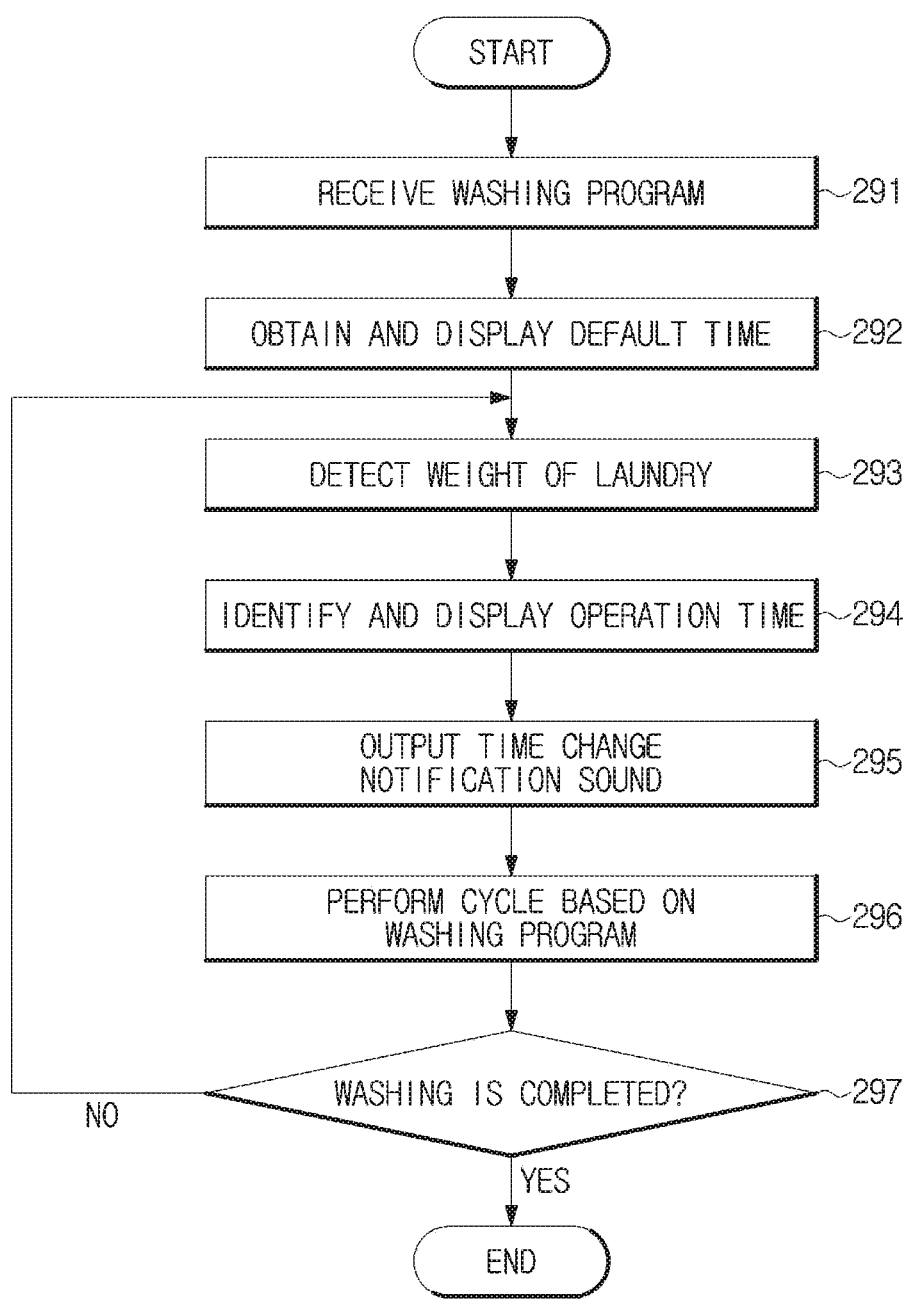
FIG. 17 is a flowchart of the clothes treatment apparatus according to another embodiment of the disclosure.

FIG. 17 is a flowchart of the washing machine according to another embodiment of the disclosure, which will be described with reference to FIGS. 14, 15, 16A and 16B.

The washing machine corresponding to the clothes treatment apparatus activates the control panel 200 based on a power on command being input.

Based on the washing program being selected by the user and received (291), the washing machine obtains the default time corresponding to the received washing program, among the information stored in the storage, and displays the obtained default time (292).

Further, the washing machine may obtain the default time at the time when the operation start command is received, and the option selection information is received.

The identifying of the default time may include obtaining the default time corresponding to the same washing program as the received washing program, among the default time for each washing program stored in the storage 251.

For example, the washing machine identifies at least one default time corresponding to the received washing program, among the default times for each washing program stored in the storage 251, obtains the most recently stored default time among the obtained default times, and displays the obtained default time on the display.

As another example, the washing machine identifies at least one default time corresponding to the received washing program, among the default times for each the washing program stored in the storage 251, calculates an average time of the obtained at least one default time, obtains the calculated average time as the default time, and displays the obtained default time on the display.

As yet another example, the washing machine identifies at least one default time corresponding to the received washing program, among the default times for each the washing program stored in the storage 251, obtains a predetermined number of default time, which is recently stored default time, among the identified at least one default time, calculates an average time of the identified default times, obtains the calculated average time as the default time, and displays the obtained default time on the display.

As yet another example, the washing machine identifies at least one default time corresponding to the received washing program, among the default times for each the washing program stored in the storage 251, obtains the longest default time among the identified at least one default times and displays the obtained default time on the display.

As yet another example, the washing machine identifies at least one default time corresponding to the received washing program among the default times for each the washing program stored in the storage 251, obtains the shortest default time among the identified at least one default times and displays the obtained default time on the display.

Based on the operation start command being received, the washing machine detects an actual weight of the laundry by rotating the drum 140 while displaying the default time on the display (293).

The identification of the actual weight of the laundry includes detecting at least one piece of input-output information of the motor 150 configured to apply the rotational force to the drum 140 and detecting a weight of the laundry based on the detected at least one piece of information.

The washing machine identifies the weight level corresponding to the detected actual weight of the laundry, and displays an actual operation time corresponding to the identified level and the received washing program on the display (294). The displayed operation time may be a reaming time of the operation of the washing machine.

The identification of the actual operation time includes identifying a setting time corresponding to the detected weight level, among the weight level of the received washing program, and identifying the identified setting time as the actual operation time.

In addition, based on the option being selected, the washing machine may identify the weight level corresponding to the detected actual weight of the laundry, identify an actual operation time corresponding to the identified weight level, the received wash program and the selected option, and display the identified actual operation time on the display.

When the weight of the laundry is detected, the washing machine changes the default time displayed on the display 220 to the actual operation time and displays the actual operation time, and outputs time change notification information as a sound (295).

In other words, the washing machine displays the default time corresponding to the received washing program, and when the actual weight of the laundry contained in the drum is detected, the washing machine displays the actual operation time corresponding to the detected actual weight and the received washing program.

When the detection of the weight of the laundry is completed, the washing machine performs at least one of the wash cycle, the rinse cycle, the dewatering cycle and the dry cycle based on the detected weight of the laundry and the received washing program (296).

When the option is selected and the detection of the weight of the laundry is completed, the washing machine performs at least one of the wash cycle, the rinse cycle, the dewatering cycle and the dry cycle based on the detected weight of the laundry, the received washing program, and the selected option.

The washing machine re-identifies the weight of the laundry corresponding to the detection information detected by the detector 230 during the execution of any one cycle. The washing machine identifies whether the weight of the laundry, which is re-identified, is different from the weight of the laundry, which is detected upon detecting the weight. When it is identified that two weights of the laundry is different from each other, the washing machine obtains a remaining time based on a remaining cycle in the received washing program and the re-identified weight of the laundry, and display the remaining time.

The detection of the weight of the laundry during the execution of any one cycle may include re-detecting the weight of the laundry before at least one of the wash cycle, the rinse cycle, the dewatering cycle and the dry cycle is performed, or after at least one of the wash cycle, the rinse cycle, the dewatering cycle and the dry cycle is completed.

The wash cycle includes water supplying, washing, draining and intermediate dewatering, and the rinse cycle includes water supplying, washing, draining and intermediate dewatering. The dewatering cycle includes final dewatering.

For example, when re-detecting the weight of the laundry before performing the intermediate dewatering in one of the wash cycle and the rinse cycle or when re-detecting the weight of the laundry before performing the final dewatering, the washing machine may detect the weight of the laundry in a wet-state, and identify an actual weight of the laundry corresponding to the detected weight of the laundry based on the information stored in the storage.

As another example, when re-detecting the weight of the laundry after performing the intermediate dewatering in one of the wash cycle and the rinse cycle, the washing machine may detect the weight of the laundry in a dewatered-state, and identify an actual weight of the laundry corresponding to the detected weight of the laundry.

As yet another example, when re-detecting the weight of the laundry after performing the final dewatering, or before performing the dry cycle, the washing machine may detect the weight of the laundry in the dewatered-state, and identify an actual weight of the laundry.

In addition, when detecting the weight of the laundry before the operation, the washing machine may detect the weight of the laundry after soaking the laundry in the drum by controlling the water supply.

The detection of the weight of the laundry is to identify whether the user additional puts laundry via the auxiliary door. Further, the detection of the weight of the laundry may be to identify whether the user takes out laundry via the auxiliary door.

For example, the washing machine detects the weight of the laundry before the rinse cycle is performed when the wash cycle is completed. When the weight of the laundry is identified to be larger than that before the wash cycle, the washing machine identifies an increase in the water supply time for increasing the amount water for the rinse and identifies an additional time caused by the additional rinse. The washing machine adjusts a remaining time from the rinse cycle to the dewatering cycle or from the rinse cycle to the dry cycle based on the selected additional time and display the adjusted remaining time.

That is, the washing machine may display the remaining time by adjusting the remaining time according to the weight change of the laundry during operation.

The washing machine performs the washing operation based on the received washing program and at least one option while detecting the weight of the laundry until all the cycle corresponding to the received washing program are completed (297).

When the execution of the received washing program is completed, the washing machine stores the detected weight of the laundry, the actual operation time, and the received washing program in the storage 251.

The storing of the washing program and the operation time in the storage 251 includes additionally storing the actual operation time as the default time corresponding to the washing program by using the received washing program, among the information stored in the storage.

The storing of the washing program and the operation time in the storage 251 may identify default times of the washing program corresponding to the received washing program, among the information stored in the storage, calculate an average time of the identified default times and the actual operation time, and store the calculated average time as the default time.

Further, based on the option being selected, the washing machine may display the actual operation time, and store the detected weight of the laundry, the actual operation time, the received washing program, and the selected option in the storage.

As mentioned above, the washing machine updates the information stored in the storage by storing the actual operation time corresponding to the received washing program, as the default time in the storage 250.

Accordingly, when being operated later with the same washing program as the received washing program, the washing machine may allow the default time to be displayed by using the actual operation time, which is currently obtained.

Figure 18:
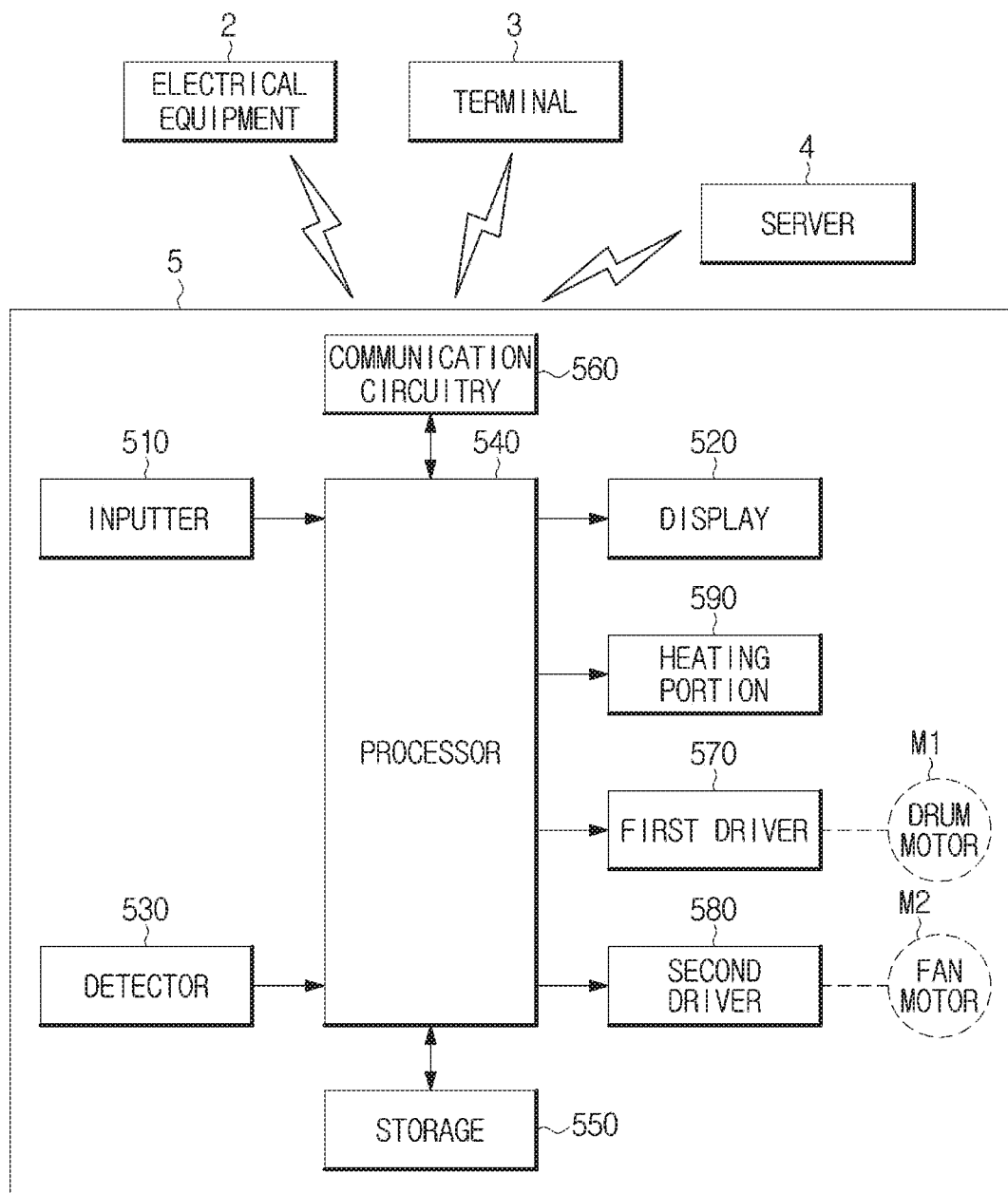
FIG. 18 is a block diagram of a clothes treatment apparatus according to still another embodiment of the disclosure.

FIG. 18 is a block diagram of a clothes treatment apparatus according to still another embodiment of the disclosure.

The clothes dryer 500 will be described as an example of the clothes treatment apparatus according to another embodiment.

The clothes dryer 500 includes an inputter 510, a display 520, a detector 530, a processor 540, a storage 550, a communication circuitry 560, a first driver 570, a second driver 580 and a heating portion 590.

First, the structure of the clothes dryer will be briefly described.

The clothes dryer 500 may include a body forming an external appearance, a drum rotatably installed in the body and accommodating an object to be dried, a door opening and closing the drum, a motor rotating the drum, a heating portion and a blower drying the object to be dried in the drum, and a fan motor rotating a blowing fan of the blower.

The clothes dryer may further include an air inlet provided at the rear surface of the drum for sucking hot air and an air outlet provided at a lower portion of the drum for discharging air containing moisture to the outside.

The clothes dryer may include a humidity detector (not shown) detecting the humidity inside the drum, and may identify the degree of dryness of the laundry based on the amount of moisture detected by the humidity detector.

The clothes dryer may further include an auxiliary door allowing the object to be dried to be put during the dry cycle.

As illustrated in FIG. 18, the inputter 510 of the clothes dryer receives an operation start command, a pause command, and an operation stop command, receives a drying program, and may further receive at least one option.

The inputter 510 may receive at least one of weather, season, day of the week and date.

The inputter 510 may include a plurality of buttons receiving start, pause, and stop commands, and may further include a jog dial receiving the drying program.

The inputter 510 may further include a plurality of buttons receiving an option.

The inputter 510 transmits the input information input by the user to the processor 540.

The display 520 displays the default time based on the control command of the processor 540 and displays the actual operation time of the clothes dryer after a predetermined period of time has elapsed.

The predetermined period of time may be a period of time required to detect the weight of the object to be dried and to identify the setting time of drying corresponding to the weight of the object to be dried.

The display 520 may display the drying program selected by the user and at least one option by the user.

The display 520 displays the default time, the actual operation time, and the remaining time.

Figure 19:
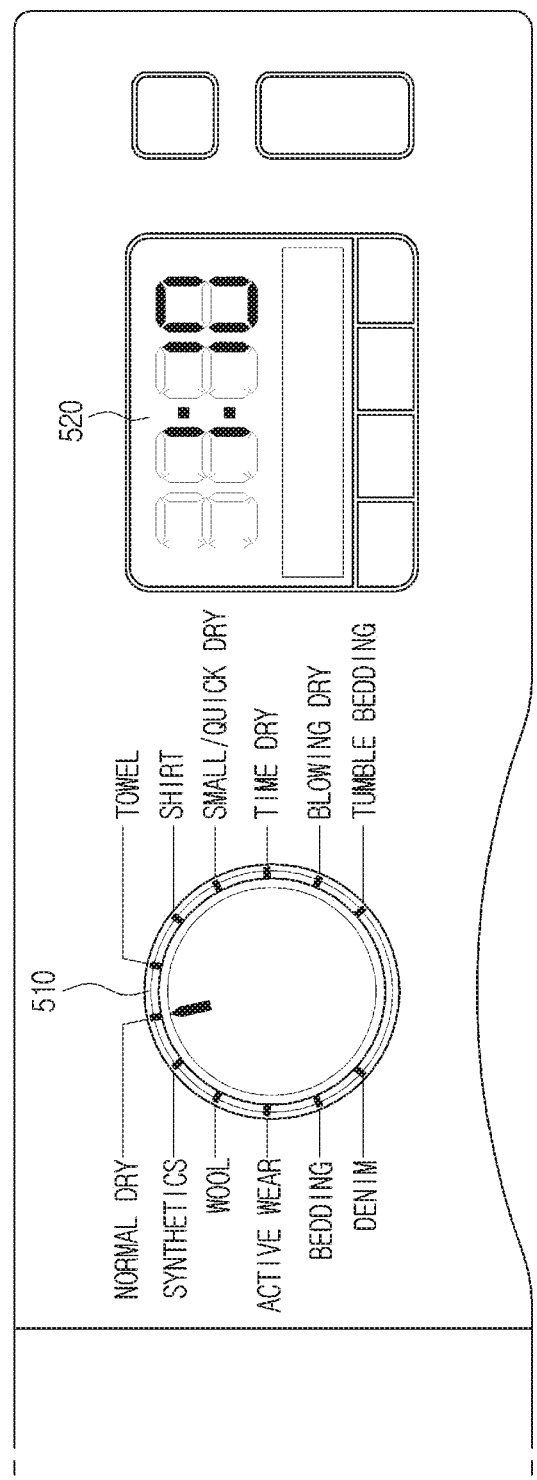
FIG. 19 is a view illustrating a display of a control panel of the clothes treatment apparatus according to still another embodiment of the disclosure.

As illustrated in FIG. 19, upon receiving the drying program, the display 520 of the clothes dryer may display the default time corresponding to the received drying program and the weight estimation information of the object to be dried.

Figure 20:
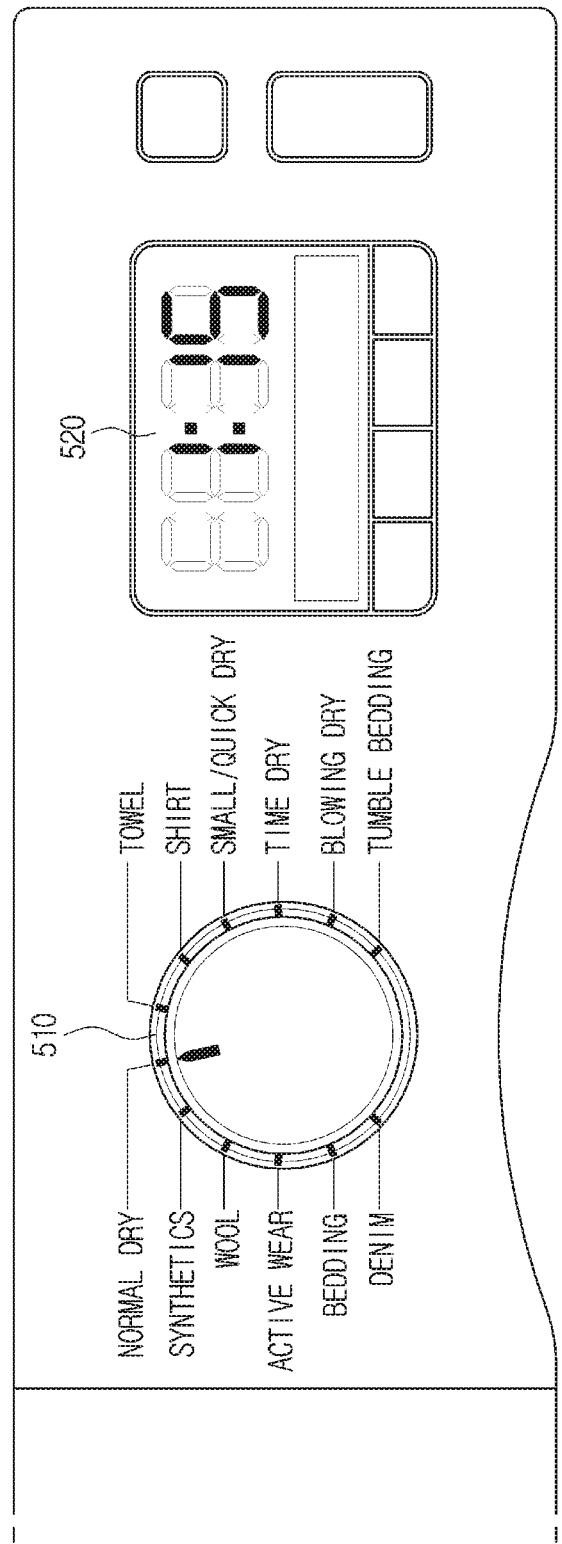
FIG. 20 is a view illustrating the display of the control panel of the clothes treatment apparatus according to still another embodiment of the disclosure.

As illustrated in FIG. 20, upon receiving a drying operation command, the display 520 of the clothes dryer performs weight detection of the object to be dried and displays the actual operation time corresponding to the detected weight of the object to be dried and the received drying program.

In addition, when the weight of the object to be dried changes while the object is dried, the display 520 of the clothes dryer may obtain a remaining time based on the changed weight of the object to be dried, the received drying program and the elapsed time, and display the obtained remaining time.

This may allow the user to recognize the drying time quickly.

The display 520 includes a plurality of seven segments.

The display 520 may include a flat panel display such as a liquid crystal display (LCD), and may further include a light emitting diode (LED).

The display 520 may be provided on a control panel of the body of the clothes dryer together with the inputter 510.

The detector 530 includes a weight detector configured to detect the weight of the object to be dried (i.e., clothes). The object to be dried includes clothes and may further include bedding and a towel.

The detector 530 may be a sensor configured to detect at least one of input information and output information of a motor M1 configured to apply a rotational force to the drum when the drum rotates based on a control command of the processor 540. For example, the detector 530 may detect at least one of the current, the voltage, the torque, and the number of revolutions of the motor M1.

Upon receiving the drying program that is input via the inputter 510, the processor 540 identifies current (i.e., today) weight estimation information of the object to be dried, and identifies a default time corresponding to the received drying program and the identified weight estimation information of the object to be dried, based on the information stored in the storage 550 and controls the display of the identified default time.

The processor 540 includes a timer configured to count the current weather and the time. When identifying the current weight estimation information of the object to be dried, the processor 540 may identify the current date and day of the week that is counted by the timer, and identify the current season based on the identified date.

The processor 540 may identify at least one of the date, season, weather, and day of the week input to the inputter 510 and further identify at least one of the date, season, weather, and day of the week received via the communication circuitry 560.

Upon receiving the drying program input via the inputter 510, the processor 540 may identify the default time corresponding to the received drying program and control the display of the identified drying time.

Upon receiving the drying program input via the inputter 510, the processor 540 may identify the weight of the object to be dried corresponding to the received drying program, identify the setting time corresponding to the identified weight, and allow the identified setting time to be displayed as the default time.

The processor 540 may transmit the received drying program to a terminal 3 or a server 4 through the communication circuitry 560 based on the drying program being received. The processor 540 may receive the default time from the terminal 3 or the server 4, and allow the display 520 to display the received default time.

Upon receiving drying program and default time request information from the clothes dryer, the server 4 identifies identification information of the user of the clothes dryer and obtains a default time, which is stored in a clothes dryer of the other user having the same condition as the identification information of the identified user, and transmits the obtained default time to the clothes dryer which requested the default time.

Upon receiving the drying program and at least one option, the processor 540 identifies a default time corresponding to the received drying program, at least one option and the identified weight estimation information of the object to be dried based on the information stored in the storage 550 and allows the display to display the identified default time.

The weight estimation information of the object to be dried includes at least one of day of the week, the date, the season, and weather.

The information stored in the storage 550 may include information on a default time corresponding to the weight estimation information of the object to be dried for each drying program and may further include information on a default time corresponding to the weight estimation information of the object to be dried for each option of the drying program.

In addition, the processor 540 may identify the weight estimation information of the object to be dried at the time when the drying program is received, the operation start command is received, the option selection information is received, or the power on command is received.

The processor 540 may identify a stop period of the clothes dryer based on the drying program being received. When it is identified that the identified stop period is a predetermined period of time or longer, the processor 540 may identify a weight of the object to be dried, which is the greatest among a weight of the object to be dried detected in the past, and identify a setting time corresponding to the identified weight of the object to be dried and the received drying program and allow the identified setting time to be displayed as the default time.

Upon receiving the drying program, the processor 540 may identify whether the current date is a holiday or not. When it is identified that the current date is a holiday, the processor 540 may identify a weight of the object to be dried on the weekends or a weight of the object to be dried, which is the greatest among a weight of the object to be dried detected in the past, identify a setting time corresponding to the identified weight of the object to be dried and the received drying program and display the identified setting time as the default time.

Upon receiving the operation start command, the processor 540 identifies the weight of the object to be dried corresponding to the detection information of the detector 530, obtains a setting time as a default time based on the weight of the object to be dried and the received drying program, and controls the operation of the display 520 so that the display 520 changes the default time displayed on the display 520 into the actual operation time and displays the actual operation time.

The processor 540 may allow a time change notification displayed on the display to be output on the display 520 or through a speaker (not shown).

The processor 540 updates the information stored in the storage by cumulatively storing the actual operation time corresponding to the received drying program and the identified weight estimation information of the object to be dried, as the default time in the storage 550.

Accordingly, when the clothes dryer is operated later under the same drying program and weight estimation information of the object to be dried, it may be possible to allow the actual operation time, which is currently obtained, to be displayed as the default time.

When storing the actual operation time as the default time in the storage 550, the processor 540 may identify information having the same condition as the received drying program, among the information stored in the storage 550, and store an average time of the identified default time and the obtained actual operation time as a new default time.

In addition, when storing the actual operation time as the default time in the storage 550, the processor 540 may identify a weight of the object to be dried corresponding to information having the same condition, calculate an average weight of the identified weight of the object to be dried and the detected weight of the object to be dried, and store the calculated average weight together with the average time.

When storing the actual operation time as the default time in the storage 550, the processor 540 may identify a weight of the object to be dried corresponding to the information having the same condition, calculate an average weight of the identified weight of the object to be dried and the detected weight of the object to be dried, identify a weight level corresponding to the calculated average weight of object to be dried, identify a setting time corresponding to the identified weight level, and store the identified setting time as a default time.

The information having the same condition is information having the same drying program and weight estimation information the object to be dried as the received drying program and the identified weight estimation information the object to be dried, among the information stored in the storage 550.

When displaying the actual operation time after detecting the weight of the object to be dried, the processor 550 may identify the weight level corresponding to the weight of the object to be dried, and identify a setting time corresponding to the identified weight level and the drying program, and display the identified setting time as an actual operation time.

The processor 540 may re-identify the weight of the object to be dried corresponding to the detection information detected by the detector 530 during the execution of the drying program. When it is identified that the weight of the object to be dried, which is re-identified, is different from the weight of the object to be dried, which is detected upon detecting the weight, the processor 540 may obtain a remaining time and allow the display to display the obtained remaining time.

The processor 540 controls the operation of the display 520 to display the drying program selected by the user and at least one option selected by the user. When the operation start command is received, the processor 540 controls the operation of the drum motor M1, the heating portion 590, and the fan motor M2 based on the received drying program and option, so that the drying program corresponding to the selected drying program and at least one option is performed.

Particularly, during the execution of the drying program, the processor 540 identifies the weight of the object to be dried corresponding to the detection information detected by the detector 530 and controls the drying program by regulating the amount of heating of the heating portion 590, the amount of rotation of the drum, and the blowing amount of the fan based on the identified weight of the object to be dried and the drying program selected by the user.

The storage 550 may store a plurality of weight levels corresponding to the weight ranges of the plurality of objects to be dried, and may store a setting time for each drying program corresponding to the plurality of weight levels.

The storage 550 stores a default time corresponding to at least one drying program selected by the user and the weight estimation information of the object to be dried.

The default time corresponding to at least one of the drying programs and the weight estimation information of the object to be dried may be operation information of the clothes dryer, which is previously operated by the user, and may be an average value of an actual operation time corresponding to the drying program selected by the user and the weight of the object to be dried placed in the drum.

For example, the drying program may include normal dry, synthetics, wool, delicates, active wear, bedding, towel, shirt, and quick dry.

The weight estimation information of the object to be dried may be factors influencing the change in weight depending on the amount of the object to be dried by the user.

The weight estimation information of the object to be dried is information for estimating the weight of the object to be dried contained in the drum of the clothes dryer, and may include at least one of day, date, season, weather, and room temperature. In addition, the weight estimation information of the object to be dried may further include the number of family members, age and sex of the user.

The storage 550 may store the default time corresponding to the at least one drying program, the at least one option and the weight estimation information of the object to be dried.

The storage 550 may store the default time corresponding to the at least one drying program, the at least one option and the weight estimation information of the object to be dried.

The options may include wrinkle release, degree of dryness, and dry cycle time.

The storage 550 may store information on the default time for each condition as a lookup table. Conditions include at least one of the drying program, options and the weight estimation information of the object to be dried.

For example, the storage 550 may store a default time of the normal dry for each day of the week, and a default time of the wool dry for each day of the week.

The storage 550 may store a default time of the spring normal dry for each day of the week, a default time of the summer normal dry for each day of the week, a default time of the fall normal dry for each day of the week, and a default time of the winter normal dry for each day of the week.

The storage 550 may store a default time of the normal dry for each weather, a default time of the normal dry for each date, and a default time of the bedding dry for each season.

In other words, the storage 550 may store a default time of each drying program for each day of the week, a default time of each drying program for each date, a default time of each drying program for each season, and a default time of each drying program for each room temperature.

The storage 550 may store a default time for each day of the week with respect to each drying program and each option, a default time for each date with respect to each drying program and each option, a default time for each season with respect to each drying program and each option, and a default time for each room temperature with respect to each drying program and each option.

The storage 550 may store a default time for each day of the week with respect to each drying program and each season, a default time for each date with respect to each drying program and each season, and a default time for each room temperature with respect to each drying program and each season.

With respect to the weight of the object to be dried, the storage 550 may store additional time for each option about each drying program.

The storage 550 may store the number of family members, sex and age of the user, and may store identification information of the clothes dryer.

The storage 550 may update default time for each conditions based on a control command of the processor 540.

The storage 550 may store a level corresponding to the weight level of the object to be dried and a setting time for each drying program corresponding to each level.

The storage 550 may include a volatile memory such as a static random access memory (S-RAM) or a dynamic random access memory (D-RAM) for temporarily storing data, and a non-volatile memory such as a read only memory, an erasable programmable read only memory (EPROM), or an electrically erasable programmable read only memory (EEPROM) for storing data for long time.

The communication circuitry 560 includes wired/wireless communication and performs communication with at least one of electrical equipment 2, the terminal 3, and the server 4.

The communication circuitry 560 may receive at least one of the days of the week, the date, the season, the weather, the room temperature, and the room humidity from at least one of the electrical equipment 2, the terminal 3, and the server 4.

The electrical equipment 2 may be a home appliance located in the house and capable of communication. For example, the electrical equipment 2 may be a refrigerator, a television, a microwave oven, an oven, or a dishwasher.

The terminal 3 is a mobile device capable of wired/wireless communication and includes any one of a tablet, a smart phone, and a lap-top computer.

The terminal 3 may display the default time for the drying program performed for each day of the week, season, temperature, and weather.

In addition, the terminal 3 may provide weather information, the date, the season, and the day of the week to the clothes dryer 1 through a single APP and display drying information for drying. The drying information may include a default time for the drying program performed for each the day of the week, the season, the temperature, and the weather, and may include operation information of the clothes dryer.

The communication between the clothes dryer 1 and the terminal 3, and the communication between clothes dryer 1 and the electrical equipment 2 includes a communication in the close contact state or within a predetermined distance.

That is, the communication circuitry 560 performs wireless communication such as NFC, RFID, Bluetooth, ZigBee, and WIFI, with the electrical equipment 2 and the terminal 3. In addition, the communication circuitry 560 may perform short-range wireless communication such as NFC, RFID, Bluetooth, and ZigBee, with the electrical equipment 2 and the terminal 3 due to the cost of the communication circuitry.

The server 4 may be a weather server, and may be a drying information providing server that stores identification information of the clothes dryer, and identification information of a user, and manages the clothes dryer 1.

The identification information of the clothes dryer may include at least one of the type, model, manufacture number, and manufacturer of the clothes dryer.

The server 4 provides the clothes dryer with today or current weather, dates, seasons, and days of the week.

In addition, the server 4 may identify the identification information of the user, group them into users having the same conditions, collect the drying time required for the drying program performed for each day of the week, the season, the temperature, and the weather, obtain a new default time of the drying program performed for each day of the week, the season, the temperature, and the weather, and transmit the obtained default time of the drying program performed for each day of the week, the season, the temperature, and the weather to a clothes dryer of a user in the same group.

The identification information of the user may include the ID or name of the user, the number of family members of the user, the age of the user, and the sex of the user.

The first driver 570 drives the motor M1 based on the control command of the processor 540.

That is, the first driver 570 may supply current to the motor M1 based on the control command of the processor 540. For example, the first driver 570 may include an inverter circuit configured to supply a driving current, which is calculated based on a speed command of the processor 540 and a rotation speed of the motor M1, to the motor M1.

In addition, the first driver 570 may include a power switching circuit configured to allow or block current flow to the motor M1 in response to an on/off command of the processor 540.

The second driver 580 drives the fan motor M2 based on the control command of the processor 540.

That is, the second driver 580 may supply current to the fan motor M2 based on the control command of the processor 540. For example, the second driver 580 may include an inverter circuit configured to supply a driving current, which is calculated based on a speed command of the processor 540 and a rotation speed of the fan motor M2, to the fan motor M2.

The heating portion 590 may include one or more heaters.

The heating portion 590 may be turned on and off based on a control command of the processor 540. Further, the heating portion 590 may change the on-off period based on the control command of the processor 540.

A control method of the display of the drying time of the clothes dryer 500 is similar to the control method of the display of the remaining time of the clothes treatment apparatus according to an the embodiment, and thus a description thereof will be omitted.

Although the present embodiment has been described with respect to the configuration in which the drum and the blowing fan in the blower are rotated by separate motors, it is also possible that the drum and the blowing fan in the blower are rotated by a single motor.

As is apparent from the above description, before detecting a weight of the laundry (i.e., clothes), it is possible to obtain a default time required for washing based on a variety of information such as a day of the week, season, date, and room temperature, and pre-stored information, and it is possible to display the obtained default time. Therefore, it is possible to more quickly provide information on the time required for washing to the user.

Before detecting a weight of the laundry, it is possible to more quickly provide information on the time required for washing to the user by displaying a default time corresponding to a program selected by the user.

Accordingly, when a program of the clothes treatment apparatus is selected by a user, it is possible to immediately inform the user of a relatively accurate operation time, thereby minimizing the inconvenience that the user has to check the operation time several times, and thus it is possible to improve the physical and psychological stability of the user.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored. For example, there may be a Read Only Memory (ROM), a Random Access Memory (RAM), a magnetic tape, a magnetic disk, a flash memory, and an optical data storage device.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A clothes treatment apparatus comprising:
   a drum configured to accommodate clothes;
   an inputter configured to:
     receive one of a plurality of programs, and
     receive a start command;
   a storage configured to:
     store first information on a setting time corresponding to a weight of clothes for each program of the plurality of programs, the weight of clothes detected by a detector, and
     store second information on a default time for each program of the plurality of programs in a table, wherein the default time for one of the plurality of programs corresponds to a previous period of time to complete the one program;
   a processor configured to:
     determine the weight of clothes when a first program of the plurality of programs is received and the start command is received,
     identify a setting time corresponding to the weight of clothes and the first program from the first information,
     execute the first program based on the identified setting time, and
     store as an additional default time, an operation time, corresponding to a period of time to complete the first program; and
   a display configured to display a remaining time while the first program is executed,
   wherein when the remaining time is initially displayed, the remaining time is based on the second information.

2. The clothes treatment apparatus of claim 1, wherein before the weight of clothes is determined, the processor is configured to:
- obtain a default time corresponding to the first program from the second information,
- wherein the remaining time that is displayed is the obtained default time.

3. The clothes treatment apparatus of claim 2, wherein the processor is configured to:
- obtain a plurality of default times corresponding to the first program from the second information,
- wherein the remaining time that is displayed is an average time of the obtained plurality of default times.

4. The clothes treatment apparatus of claim 2, wherein the processor is configured to:
- obtain a plurality of default times corresponding to the first program from the second information,
- wherein the remaining time that is displayed is a most recently stored time among the obtained plurality of default times.

5. The clothes treatment apparatus of claim 2, wherein the processor is configured to:
- obtain a plurality of default times corresponding to the first program from the second information,
- wherein the remaining time that is displayed is a minimum time among the obtained plurality of default times.

6. The clothes treatment apparatus of claim 2, wherein the processor is configured to:
- obtain a plurality of default times corresponding to the first program from the second information,
- wherein the remaining time that is displayed is a maximum time among the obtained plurality of default times.

7. The clothes treatment apparatus of claim 2, wherein when the weight of clothes is detected, the processor is configured to:
- change the remaining time that is displayed on the display to the identified setting time, and
- displays the identified setting time.

8. The clothes treatment apparatus of claim 7, further comprising:
- a sound outputter configured to output a sound when the remaining time on the display is changed into the identified setting time.

* * * * *